(12) United States Patent
Puskas

(10) Patent No.: US 9,790,301 B2
(45) Date of Patent: Oct. 17, 2017

(54) TERPENE/ISOOLEFIN COPOLYMERS HAVING SUBSTANTIALLY HETEROGENEOUS COMPOSITIONAL DISTRIBUTION AND DISPLAYING THERMOPLASTIC ELASTOMERIC PROPERTIES

(71) Applicant: The University of Akron, Akron, OH (US)

(72) Inventor: Judit E. Puskas, Akron, OH (US)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 14/701,640

(22) Filed: May 1, 2015

(65) Prior Publication Data
US 2015/0274865 A1 Oct. 1, 2015

Related U.S. Application Data

(63) Continuation of application No. 14/372,963, filed as application No. PCT/US2013/021896 on Jan. 17, 2013, now abandoned.

(60) Provisional application No. 61/587,736, filed on Jan. 18, 2012, provisional application No. 61/590,456, filed on Jan. 25, 2012.

(51) Int. Cl.
*C08F 210/12* (2006.01)
*C08L 23/22* (2006.01)
*C08F 297/00* (2006.01)
*C08F 236/22* (2006.01)

(52) U.S. Cl.
CPC .......... *C08F 210/12* (2013.01); *C08F 236/22* (2013.01); *C08F 297/00* (2013.01); *C08L 23/22* (2013.01); *Y10T 428/1386* (2015.01)

(58) Field of Classification Search
CPC .............................. C08F 210/12; C08L 23/22
USPC .............................. 524/35, 495, 574; 428/12
See application file for complete search history.

(56) References Cited

U.S. PATENT DOCUMENTS

2009/0218024 A1* 9/2009 Tsou ................. B32B 25/04
152/450

OTHER PUBLICATIONS

Priola et al, Copolymerization of Isobutene with 2,4,6-Octatriene and Other Triconjugated Trienes, Polymer Bulletin, Jun. 1981, 743-750.

* cited by examiner

*Primary Examiner* — Deve E Valdez
(74) *Attorney, Agent, or Firm* — Renner Kenner Greive Bobak Taylor & Weber

(57) ABSTRACT

Copolymers having a substantially heterogeneous composition distribution and strong UV absorption are the direct reaction product of an isoolefin and at least one terpene having the molecular formulae of $(C_5H_8)n$ where n is equal to or greater than two, and optionally additional monomers. More specifically, the invention relates to copolymers of isobutylene and alloocimene that exhibit thermoplastic elastomeric properties and exhibit strong filler interaction. The present invention also relates to methods for producing copolymers of at least one isoolefin and at least one terepene by a two-phase living polymerization that produces a substantially linear triblock and multiblock copolymer having substantially heterogeneous distribution of the isoolefin and terpene units.

14 Claims, 31 Drawing Sheets

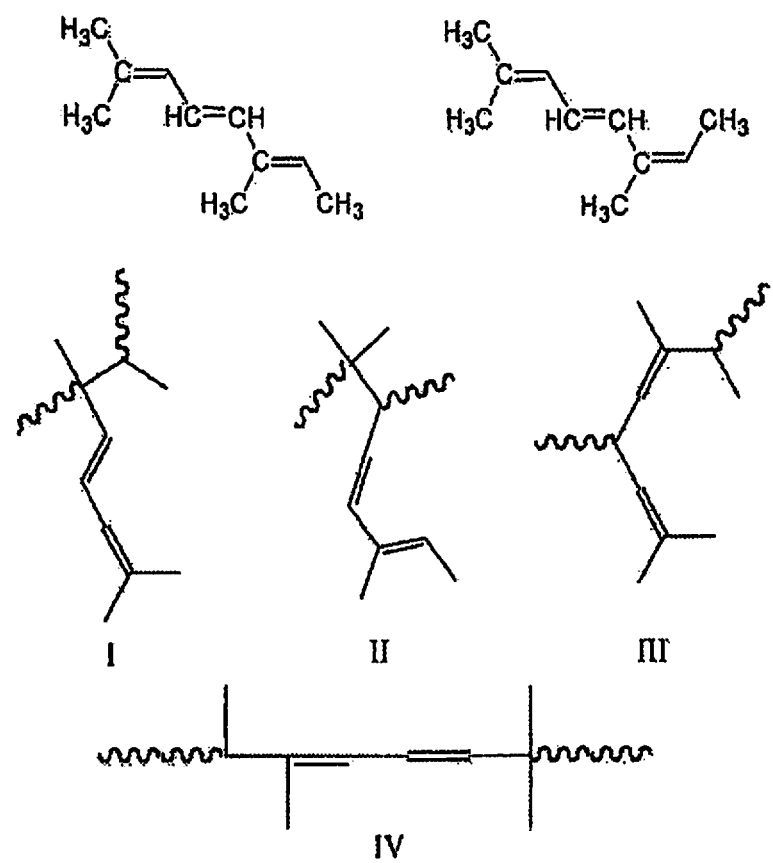
FIG. Scheme 1: Enchainment structures of alloocimene identified by Marvel
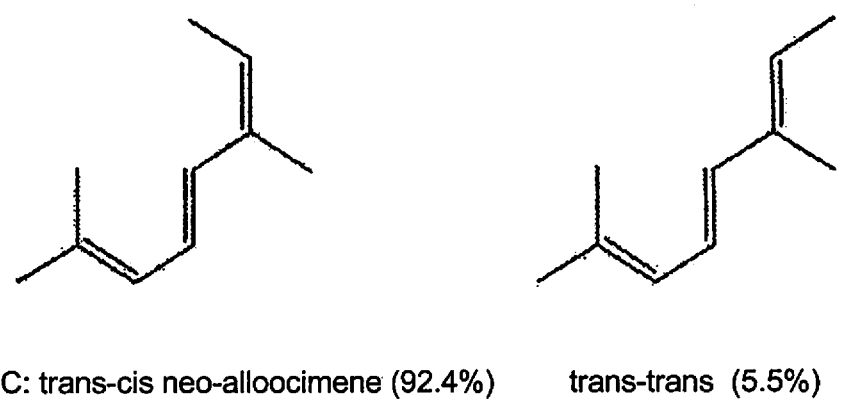
GC: trans-cis neo-alloocimene (92.4%)   trans-trans (5.5%)
FIG. Scheme 2: Structure and composition of alloocimene

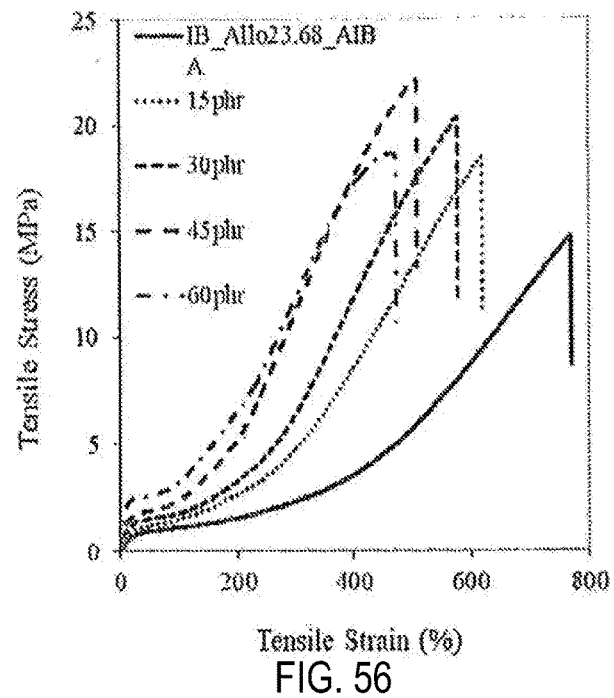
FIG. 56
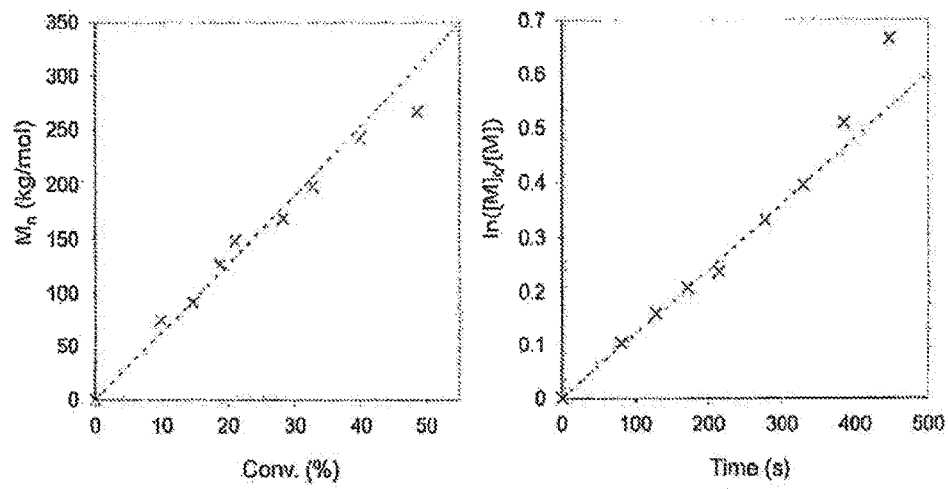
FIG. 57(a)
FIG. 57(b)

TERPENE/ISOOLEFIN COPOLYMERS HAVING SUBSTANTIALLY HETEROGENEOUS COMPOSITIONAL DISTRIBUTION AND DISPLAYING THERMOPLASTIC ELASTOMERIC PROPERTIES

CROSS-REFERENCE

This application is a Continuation of U.S. patent application Ser. No. 14/372,963, filed Jul. 17, 2014, which is a National Phase filing claiming the priority filing date of PCT/US2013/021896, filed Jan. 17, 2013, which claims the benefit of U.S. Provisional Application Ser. Nos. 61/587,736 filed Jan. 18, 2012 and 61/590,456 filed Jan. 25, 2012, all fully incorporated herein by reference.

HISTORY

The rubber compositions utilized in making rubber articles are typically filled with carbon black and/or silica to attain desired physical and chemical characteristics. The interaction between rubber and the filler in such rubber compositions has a profound effect on the physical properties of the vulcanizates. In fact, the interaction between the rubber and the filler regulates the degree of dispersion of the filler, and the formation of elastomer-filler interface and filler-filler network. All of these interactions have a significant effect on the physical properties of the cured rubber composition, such as stress-strain properties, energy loss under cyclic load, abrasion resistance, and tear propagation resistance. Increased polymer filler interaction enables dispersion of the filler to a finer degree to achieve a higher level of reinforcement. It also permits the incorporation of higher amounts of fillers and/or the incorporation of fillers that are difficult to disperse into conventional nonpolar rubbers.

The importance of attaining better rubber/filler interaction has been appreciated for many years and has been the subject of numerous research projects throughout the rubber industry and within academic settings. Attaining improved rubber/filler interaction is of particular interest to manufacturers of rubber products such as tires, hoses, power transmission belts, conveyor belts, windshield wiper blades, and a multitude of other industrial rubber products and consumer goods. One recognized approach for attaining better compatibility between rubbery polymers and fillers is to functionalize the rubbery polymer with moieties that improve interaction with the filler. For instance, rubbery polymers can be functionalized with amines or gamma-aminopropyl-triethoxysilane to attain better interaction with carbon black and silica.

The required amount of functional groups is very small. A few units per chain, located at the chain end or randomly distributed along the chain, are sufficient. It has been proven that a single unit of well-designed functional group in the polymer chain can drastically improve filler interaction, which consequently leads to improved tire performance. Examples are solution SBRs end-capped with amines, siloxy-isocyanurates, epoxyisocyanurates, imines, siloxy-imines, siloxy-amines, siloxy-mercaptans, and nitrones. Another example is SnCl4-coupled anionic polymers that generate filler-reactive free radicals during mixing.

The use of functional polymers is not limited to vulcanized rubbers. They are used in polymer membranes made for fuel cells, mineral oil additives, architectural coating, construction chemicals, fiber bonding materials, adhesive raw materials, carpet backing binders, adhesive raw materials and fiber bonding materials.

Functional polymers are also seen highly desirable for use in drug delivery, tissue engineering and medical devices, where the polymers have functional groups that can be used for medical applications that allow the attachment of drugs, or provide improvement of biocompatibility or promotion of bioadhesion, see US Patent Application 20050085605. Examples of such medical devices include suture anchor devices, sutures, staples, surgical tacks, clips, plates, screws, drug-delivery devices, adhesion prevention films and foams, tissue adhesives, tissue expanders, breast implants, pacemaker coatings and many other applications. While much progress has been made in the field of polymeric biomaterials, further developments must be made in order for such biomaterials to be used optimally in the body.

The present invention relates to functional polymers that exhibit strong filler interaction. In addition, new butyl-type thermoplastic elastomers (TPEs) have been discovered.

FIELD OF THE INVENTION

The present invention relates to linear copolymers having a substantially heterogeneous composition distribution, said copolymer comprising the direct reaction product of an isoolefin and at least one terpene having the molecular formulae of $(C_5H_8)n$ where n is equal to or greater than two, and optionally additional monomers. Particularly, this invention relates to linear copolymers of isobutylene and alloocimene that exhibit thermoplastic elastomeric properties. More particularly, the present invention relates to linear copolymers of isobutylene and alloocimene that exhibit strong filler interaction.

Furthermore, the present invention relates to functionalized linear copolymers of isobutylene and alloocimene. Still more particularly, the present invention relates to linear halogenated copolymers of isobutylene and alloocimene, and optionally additional monomers, and the use thereof.

BACKGROUND OF THE INVENTION

Homopolymers of alloocimene, a conjugated triene which is also classified as a tri-terpene, and copolymer of alloocimene with isobutylene is known in the art. The polymerization of conjugated trienes is quite complex considering that the monomer is a mixture of isomers and it can incorporate into the chain via numerous ways. In principle there are 12 different ways if the direction of growth is also taken into account. In addition, there is an increased potential for side reactions such as chain transfer to monomer or polymer, termination, back-biting reactions and grafting of the growing chain onto the already formed polymer. These side reactions can lead to branched structures and gel formation as well as loss of unsaturation. There are numerous articles and patents dealing with the polymerization of conjugated trienes. A comprehensive polymerization study of hexatriene, heptatriene and octatriene was carried out by Bell using anionic, cationic, emulsion and coordination polymerization systems[1]. R. Quick reported that the anionic homopolymerization of hexatriene and its block copolymerization with styrene resulted in branched and/or crosslinked products[2]. Veazey found that high molecular weight and high conjugated diene content polyalloocimene by anionic polymerization can only be obtained in polar solvents[3]. The cationic homopolymerization of alloocimene was studied by Marvel[4,5] using $Al(i-Bu)_3/TiCl_4$, $Al(i-Bu)_3/VCl_4$, $TiCl_4$, $BF_3 (C_2H_6)_2O$ and heptane or dichloromethane as solvent. He obtained amorphous soluble products with little or no cyclic structures and relatively high $T_g$ (95-150° C.). He identified four possible main enchainment structures shown in Scheme 1. He found that about 35% of the alloocimene incorporated in 6-7 enchainment (I) and the rest in 4-7 enchainment (III) as shown in Scheme 1.

The carbocationic copolymerization of trienes with isobutylene was studied by Priola and his coworkers using EtAlCl$_2$ and a 1/1 by volume mixture of heptane and methyl chloride as solvent[6]. Depending on the chemical structure of the triene, soluble or insoluble products were obtained. In case of alloocimene, chain transfer limited the reported viscosity average molecular weight ($M_v$=220,000 g/mol) in comparison with isobutylene homopolymerization ($M_v$>1 million g/mol) and only traces of conjugated unsaturation were found in the copolymer. No composition data was given.

1. Bell, V. L., J. Polymer Sci. Part A., 1964, 2(12), 5291-5303.
2. Quirk, R. P.; Rajeev, R., Rubber Chem. Tech., 1989, 62(2), 332-42.
3. Veazey, R. L., U.S. Pat. No. 4,694,059; 1987.

The copolymerization of isobutylene (IB) with isoprene (IP) in methyl chloride (MeCl) using AlCl$_3$ as a co-initiator with an initiator (water or CHI) is an important industrial process that produces butyl rubber. This is a slurry polymerization conducted at –90 to –100° C. where the polymer is in a glassy state, finely distributed in the reaction medium.[1] IP acts as a strong chain transfer agent that reduces the molecular weight (MW) relative to IB homopolymerization.[2] In the laboratory, the same system produces chunks of copolymer with lower MW, because the copolymerization is extremely fast and isothermal conditions cannot be achieved. For example, an IB-IP copolymer with $M_n$=125,000 g/mol and $M_w$=420,000 g/mol was produced in 47 sec with 86.7% conversion in the laboratory.[3] It should also be noted that in the laboratory no water addition is necessary due to the presence of adventitious moisture. In contrast, the industrial process requires the addition of a cationogen such as water or HCl, due to the much smaller surface to volume ratio.

1. Puskas, J. E.; Kaszas, G. In Encyclopedia of Polymer Science and Technology; Mark, H. F., Ed.; Wiley-Interscience 2003, Vol. 5, pp 382-418.
2. Kennedy, J. P. Cationic Polymerization of Olefins: A Critical Inventory; Wiley-Interscience: New York, 1975.
3. Puskas, J. E.; Michel, A. J.; Brister, L. B. *Kautsch. Gummi Kunstst.* 2000, 53, 1-5.

The present invention thus describes the production of copolymers comprising at least two cationically polymerizable monomers such as isobutylene and alloocimene and having a substantially inhomogeneous composition.

SUMMARY OF THE INVENTION

In accordance with the present invention applicants have discovered linear copolymers comprising the direct reaction product of isoolefin having from 4 to 7 carbon atoms and terpene having the molecular formulae of $(C_5H_8)n$ where n is equal to or greater than two, and optionally additional monomers, in which the copolymer has a substantially heterogeneous compositional distribution and strong UV absorption due to the presence of conjugated diene sequences. Thus, applicants' linear copolymers can be distinguished from previous copolymers on this basis in that they have substantially heterogeneous compositional distribution and measurable amount of conjugated diene sequences. In a preferred embodiment, the isoolefin comprises isobutylene, and the terpene comprises alloocimene.

In accordance with another aspect of the present invention, applicants have also discovered a process for producing a copolymer of isoolefin having between 4 and 7 carbon atoms and terpene which comprises admixing the isoolefin and the terpene in a copolymerization reactor under copolymerization conditions in the presence of a diluent, and a Lewis acid catalyst, such as AlCl$_3$, and maintaining the copolymerization reactor substantially free of impurities which can complex with the catalyst or which can copolymerize with the isoolefin or the terpene. In this manner applicants have discovered that they are able to produce the above-described copolymers as direct reaction products, and which, in their as-polymerized form, have a substantially heterogeneous compositional distribution, and have a high number average molecular weight ($M_n$) of greater than about 100,000 g/mol. In accordance with a preferred embodiment, the isobutylene/alloocimene copolymer is insoluble in the diluent, and the process is thus an emulsion polymerization process without using any emulsifying agents.

In accordance with the present invention, novel linear block copolymers have now been made which are extremely useful in their own right such as an elastomeric composition, ranging from elastomeric to thermoplastic elastomeric polymer compositions, and which are also particularly useful in compatibilizing certain rubber-plastic polymer blends, most particularly blends of low unsaturated elastomers, such as butyl rubbers, with thermoplastic compositions having a relatively high glass transition or melting temperature or blends of relatively saturated elastomers such as butyl rubbers, with more highly unsaturated elastomeric polymers, such as polyisoprene and natural rubber. Particular interest is the thermoplastic elastomering properties of the linear block copolymers of the invention.

In accordance with the present invention applicants have discovered functionalized copolymers of an isoolefin having from 4 to 7 carbon atoms and a terpene wherein the functional groups of the copolymer are conjugated dienes or functional groups affixed to the alloocimene units. In a preferred embodiment, the isoolefin comprises isobutylene, and the terpene comprises alloocimene.

In accordance with a preferred embodiment of the linear copolymers include the halogenation products of the structures shown in Scheme 1, where the allylic hydrogens are substituted with halogens such as Cl and Br. These products are similar to current halobutyl rubbers in that they contain allylic halide groups.

In accordance with another preferred embodiment of the linear copolymers include the alloocimene having a functionalized group affixed to the functional groups shown in Scheme 1 and is a functional group or functional groups comprising: alkoxide, phenoxide, carboxylate, thiolates, thioethers, thiocarboxylates, dithiocarboxylates, thioureas, dithiocarbamates, xanthates, thiocyanates, silanes, halosilanes, cyanides, organo lithium compounds, malonates, amides, amines, carbozoles, phthalemide, pyridine, malimide, phosphines, and cyanate and mixtures thereof. Preferably these functionalized copolymers are otherwise substantially free of any functional groups on the polymer backbone chain (i.e., on the isoolefin carbons).

BRIEF DESCRIPTION OF THE DRAWINGS

FIG. Scheme 1 relates to enchainment structures of alloocimene identified by Marvel.

FIG. Scheme 2 relates to the structure and composition of alloocimene.

FIG. 56 relates to stress-strain plots of the copolymer of Example 10.

FIG. 57(a) relates to $M_n$ vs. conversion plot; FIG. 57(b) ln($[M]_0/[M]$) vs. time plot in the carbocationic copolymerization of IB with Allo. [IB]=2.22 mol/L; [AlCl$_3$]=1.9×10$^{-3}$ mol/L; [Allo}=0.09 mol/L.

DETAILED DESCRIPTION OF THE INVENTION

Figure 1:
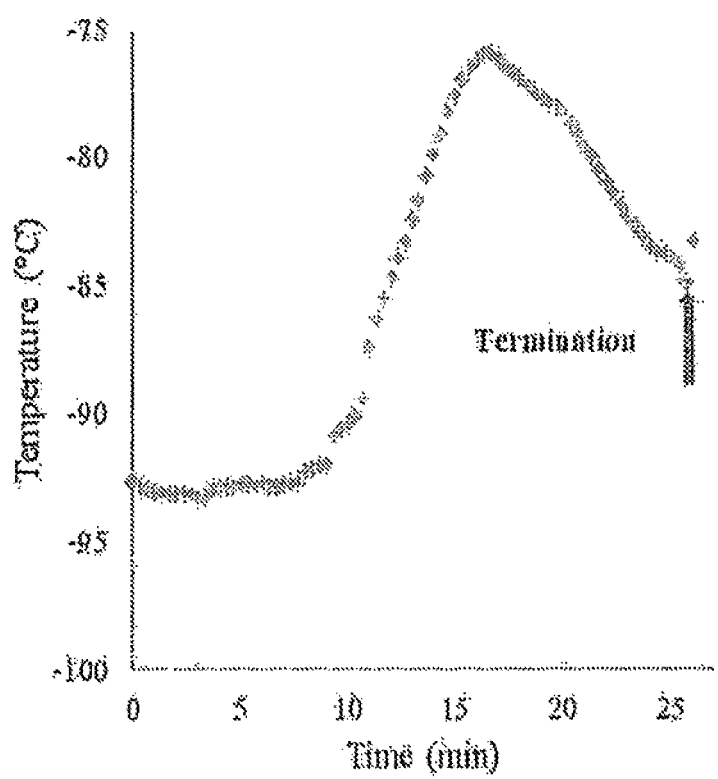
FIG. 1 relates to the temperature profile during the polymerization.

Substantially linear diblock, triblock, and multiblock copolymers are produced by a carbocationic living polymerization of one or more isoolefins and one or more terpenes that yield heterogeneous distributions of isoolefin rich portions as well as separated terpene rich portions or units within the block copolymer. The unique two phase living emulsion polymerization utilizes reasonable cost initiating systems such as an aluminum trichloride catalyst and a coinitiator such as water or hydrochloric acid in methyl-chloride. That a two-part living emulsion polymerization was achieved was completely unexpected as much as the same has never been known before for carbocationic polymerizations. The polymerization results in a low viscosity emulsion wherein the various block copolymers have very high molecular weight, high tensile strength, and the blocks phase separate and thus have good thermoplastic elastomer properties.

The isoolefin monomers of the present invention generally have from about 4 to about 7 carbon atoms with specific examples including: 2-methyl propene (isobutylene), 2-methyl-1-butene, 3-methyl-1-butene, 2-methyl-2-butene, 4-methyl-1-pentene, and any combination thereof with isobutylene being preferred.

The various terpenes have the molecular formula $(C_5H_8)n$ where n is equal to 2 or greater as up to about 20. Examples of specific terpenes include myrcene, ocimene, alloocimene, neo-alloocimene, farnesene, 4,8-dimethyl-1,3,7-nonatriene, haslene, squalene, and any combination thereof. Desired terpenes include myrcene, ocimene, alloocimene, neo-alloocimene, and any combination thereof. Preferred terpenes include alloocimene or neo-alloocimene, or any combination thereof.

The weight percent of the one or more terpenes in the block copolymer is generally from about 1 to about 50 wt %, desirably from about 5 to about 40 wt %, with from about 10 to about 30 wt % being preferred. The amount of the one or more isoolefins is generally from about 50 to about 99 wt %, desirably from about 60 to about 95 wt %, and preferably from about 70 to about 90 wt %.

Optional comonomers can also be utilized that contain from about 10 to about 50 carbon atoms, and preferably from about 5 to about 20. Specific examples of such optional monomers include various dienes, styrene, or derivatives thereof, or indene or derivatives thereof, such as: 2-methylbutadiene-1,3 (isoprene), butadiene, 2-methylbutadiene, 2,4-dimethylbutadiene, piperyline, β-pinene, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 2-methyl-1,6-heptadiene, cyclopenta-diene, methylcyclopentadiene, cyclohexadiene, 1-vinyl-cyclohexadiene, styrene, p-methylstyrene, α-methylstyrene, p-chlorostyrene, p-methoxystyrene, indene, indene derivatives, and any combination thereof. Desired optional monomers include: isoprene, butadiene, p-methylstyrene, styrene, α-methylstyrene, p-chlorostyrene, p-methoxystyrene, indene, and any combination thereof with isoprene being preferred. The amount of the one or more optional comonomers is generally from about 1 to about 30 and desirably from about 5 to about 25 parts by weight for every 100 parts by weight of the isoolefin(s) and terpene(s).

The weight average molecular weights of the block copolymer polymers according to the present invention are very high and generally are at least about 1,000 or at least about 200,000 to about 1,000,000 or about 5,000,000 g/mol, desirably from about 300,000 to about 800,000 g/mol and preferably from about 400,000 to about 600,000 g/mol.

Favorable properties of the thermoplastic elastomers of the present invention include high tensile strength such as at least about 1 mega pascals at break, desirably at least 3 mega pascals, and preferably from about 10 mega to about 30 mega pascals. In being an emulsion polymerization system, the polymerization of the present invention is not a solution polymerization and thus is free any such polymerization. Similarly, the emulsion polymerization system of the present invention is not a single phase polymerization and thus is free any single phase polymerization. Moreover, the emulsion polymerization system of the present invention generates internal emulsifiers and is free of any added emulsifying agents.

The copolymers of the present invention in being substantially linear diblock, triblock, or multiblock copolymers are not arborescent or branched copolymers. This can be established using suitable analytical techniques (SEC conformational analysis, link destruction if applicable, or viscosity measurements).

The block copolymers of the present invention have high UV adsorption at about 240 nanometers and the UV adsorption is at least twice that of the same polymer made in the absence of a terpene, i.e. a polyisoolefin.

Another important aspect of the present invention is that only suitable diluents that yield a two-phase living polymerization are utilized such as methyl chloride, dichloromethane, and the like. Non-polar solvents such as hexane, are avoided since living emulsion polymerizations of the noted monomers are not produced therein. In other words, the solvent systems of the present invention are free of any such non-polar solvent. If the same is utilized, they are utilized in only minute amounts, such as generally less than 1000 parts per million, and desirably less than 100 parts per million parts by weight of the monomers.

The general procedure for making the thermoplastic elastomer block copolymers of the present invention is generally that, the aluminum trichloride is mixed with a solvent therefore such as methyl chloride to make a saturated solution. At very low temperatures, such as from about minus 40° C. to about minus 100° C., a mixture of methyl chloride and an isoolefin are condensed into a reaction vessel. The terpene is then added to the vessel with mixing and the appropriate amount of the saturated aluminum trichloride solution in methyl chloride is then added to the reaction vessel and polymerization ensues. Typical two phase carbocationic living polymerization temperatures generally range from about minus 40° C. to about minus 100° C. with a preferred polymerization temperature range being from about minus 60 to about minus 95° C.

The amount of catalyst (coinitiator) is generally from about 0.001 to about 5.0 parts by weight and desirably from about 0.01 to about 1 part by weight for every 100 parts by weight of all the monomers. With respect to the initiator, the amount thereof of water or other suitable cation source such as HCl is from about 0.00001 to about 1.0 part by weight and desirably from about 0.0001 to about 0.1 parts by weight for every 100 total parts by weight of the two or more monomers. Moreover, the total amount of monomers in the reaction mixture is generally from about 1 to about 50 wt %, and desirably from about 10 to about 35 wt %, based upon the total weight of the two or more monomers and the one or more diluents. In the laboratory there is enough water present on the walls of the glassware to initiate the polymerization. On a larger scale when the surface to volume ratio is small water needs to be added. The ratio of the amount of copolymer produced in g over the moles of initiator defines the molecular weight of the product, similarly to other living polymerizations.

The thermoplastic elastomer block copolymers of the present invention, the linear diblock, triblock, or multiblock copolymers of the present invention can contain various fillers such as silica, carbon black, carbon nanotubes, starch, cellulose, fullerene, nanoclay, and combinations thereof. The amounts of the filler are generally conventional ranges as from about 1 to about 50 parts by weight, and desirably from about 5 to about 40 parts by weight for every 100 parts by weight of the thermoplastic elastomer block copolymers.

The following examples relate to the preparation of linear heterogeneous diblock thermoplastic elastomers using aluminum trichloride as a catalyst in a methyl chloride dilutant via a two-phase carbocationic living emulsion polymerization of isoolefin and terpene monomers. The compounds, general procedures utilized, and property measurements utilized with regard to the various examples were as follows: technical grade (80%) alloocimene, (2,6-dimethyl-2,4,6-octatriene, a mixture of isomers, with 95.6% purity from GC (lot: 547382) was purchased from Aldrich and was a mixture of trans-cis nad trans-trans alloocimene (Scheme 2). It was dried passing it through a column packed with Brockmann I activity alumina (Dynamic Adsorbents Incl., particle distribution 63-200 µm), degassed with three freeze-pump-thaw cycles and optionally cryodistilled.

Isobutylene (IB) and methyl chloride (MeCl) were obtained courtesy of ExxonMobil, and were condensed from the gas phase after passing it through a column filled with $BaO/CaCl_2$. Hexane(s) (Mallinckrodt Chemicals with 98.5 min. purity) was freshly distilled off $CaH_2$ (Aldrich). Di-tert-butylpyridine (DtBP, 97%) was obtained from TCI and used as a proton trap. N,N-Dimethyl acetamide (DMA, 99.8%, anhydrous) and titanium tetrachloride ($TiCl_4$, 99.9%) were purchased from Aldrich and used as received. Anhydrous aluminum chloride ($AlCl_3$) was purchased from Sigma-Aldrich (99.99%). The copolymerization experiments were carried out under dry nitrogen atmosphere in a dry box MBraun LabMaster 130 ($H_2O<1$ ppm, $O_2<10$ ppm).

300 MHz and 500 MHz NMR spectra were collected at room temperature with Varian Mercury 300 and Varian NMRS 500 spectrometers, respectively. Tetramethylsilane (TMS, $\delta=0$ ppm) was used as an internal reference for polymer NMR spectra. The $^1$H-NMR spectra were taken in $CDCl_3$ (~50 mg/mL) with 1024 scans and 9 seconds relaxation time. The pulse angle for the 300 MHz and 500 MHz measurements were 900 and 45° respectively.

Differential Scanning Calorimetric measurements (DSC) were carried out using a TA Instruments Q200 model using ~7 mg sample. The temperature was first decreased from 25° C. to −150° C. with a rate of 10° C./min. After holding at −150° C. for 2 minutes, the temperature was increased to 170° C. at a rate of 10° C./min and the sample was left to stay at this temperature for one minute, and then cooled back to −150° C. at the same rate. This cycle was repeated three times. The data were collected for the second and third scans. The glass transition temperatures ($T_g$) were taken as the mean value between the onset and end point temperatures. A nitrogen atmosphere was used to minimize thermal degradation of the polymers.

SEC measurements were conducted using a Polymer Laboratories PL-GPC 50 Plus system equipped with four detectors (45 and 90 degree laser detectors (650 nm wavelength), RI and UV detectors) and two Mixed-C columns (5 µm Mixed-C PL-gel 300×7.5 mm). The mobile phase was THF at 1 mL/min flow rate. Measurements were done at 40° C. MW calculations were carried out using 0.108 dn/dc value.

SEC measurements were also performed using a SEC system consists of an HPLC pump (Waters 515 HPLC Pump), a Waters 2487 Dual Absorbance UV Detector (UV), a Wyatt OPTILAB SDP Interferometric Refractometer (RI), a Wyatt DAWN EOS multi-angle light scattering detector (LS), a Wyatt ViscoStar viscometer (VIS), a Wyatt QELS quasi-elastic light scattering instrument (QELS), a Waters 717 plus autosampler and 6 STYRAGTEL® columns (HR6, HR5, HR4, HR3, HR1 and H0.5). The columns were thermostated at 35° C. and THF, freshly distilled from $CaH_2$ was used as the mobile phase at a flow rate of 1 mL/min. The results were analyzed by using the ASTRA software (Wyatt Technology). The measurements in this report were carried out without the viscometer and QELS.

Thermoplastic elastomers were mixed with silica and carbon black in a 3-piece 75 mL CW Brabender mixer equipped with Banbury rotors.

EXAMPLE 1

0.950 g (0.00712 mol) of $AlCl_3$ was added to 100 mL of MeCl to make a saturated solution. 890 mL (19.8067 mol, 1000 g) MeCl and 190 mL (2.4281 mol, 136.216 g) IB were condensed into graduated cylinders cooled in the hexane bath at minus 95° C. 17 mL (0.1012 mol, 13.786 g) Allo was measured into a 25 mL graduated cylinder at room temperature. The reactants were added into a 3000 mL round bottom flask immersed in the cooling bath and stirred with an overhead stirrer at 250 rpm until the internal temperature probe showed minus 95° C. 5 mL catalyst solution was pipetted from the clear top phase and added to the reaction mixture while the temperature was monitored with a thermocouple. A total of 45 mL catalyst solution was added in 5 mL portions. Upon addition of the first increment the color of the mixture turned to yellow and as more catalyst was added the color changed to light red/brown. As the reaction progressed, and more catalyst was added, the color turned to dark red/brown, then light yellow, then finally white. The temperature of the reaction mixture also increased as the polymerization progressed, reaching 17° C. temperature difference relative to the starting temperature (FIG. 1). After 25 minutes the reaction was terminated with 40 mL NaOH/methanol (0.4930 g (0.0123 mol) of NaOH in 100 mL of MeOH). The color of the mixture turned to white, with large polymer chunks stuck onto the stirring shaft and blade and the temperature probe. The reactor was taken out from the dry box and 500 mL of hexane was added. The large piece of precipitated polymer dissolved in approximately 15 seconds. The mixture was kept in a fume hood overnight to let the MeCl to evaporate. A semi-transparent, viscous liquid remained after the evaporation. An additional 1000 mL hexane was added to the mixture and the polymer was precipitated in MeOH: 100 mL polymer solution was added dropwise to 500 mL MeOH with vigorous agitation. The yield was 129.1829 g polymer after drying in a vacuum over for 7 days, with 129.1829 g/150 g*100=86.12% conversion.

Figure 2:
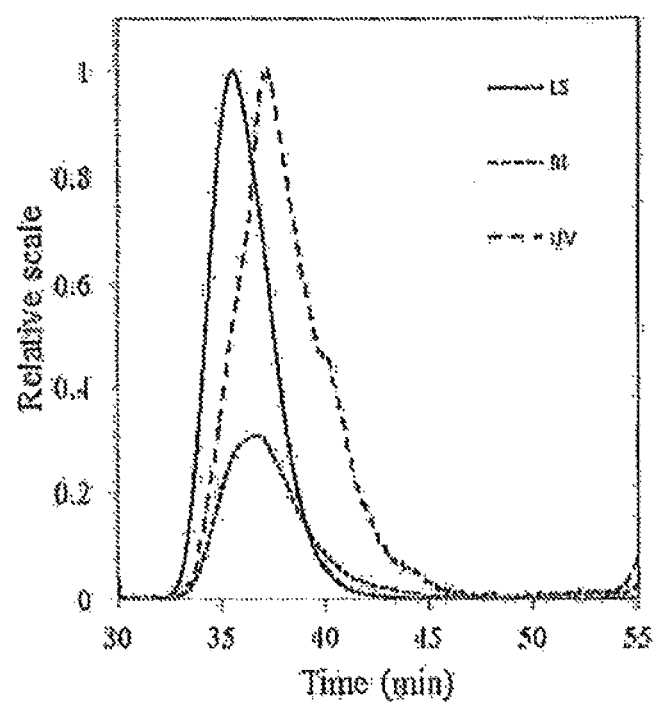
FIG. 2 relates to SEC traces of the copolymer of Example 1.

The SEC traces of the polymer of Example 1 are shown in FIG. 2. The polymer exhibited strong UV absorption at 240 nm across the whole distribution.

SEC analysis yielded $M_w$=573,000 g/mol, $M_n$=293,000 g/mol, $M_w/M_n$=1.95, $M_z$=873,000 g/mol and $R_z$=43.1 nm.

Figure 3:
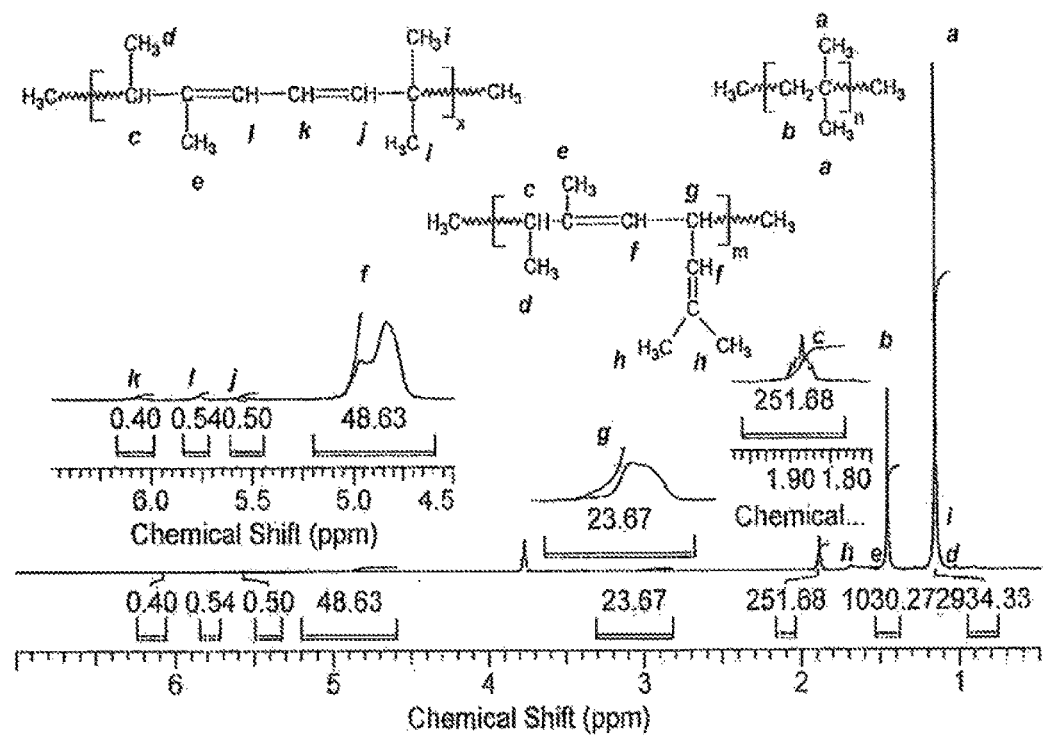
FIG. 3 relates to $^1$H NMR spectrum of the copolymer of Example 1.

FIG. 3 displays the $^1$H NMR spectrum with the proposed structures. The main structure is the 4-7 enchainment (III in Scheme 1). However, the conjugated diene structure corresponds to 2-7 enchainment (IV in Scheme 1), in contrast to structure I found by Marvel. The alloocimene content of the copolymer was calculated using two different approaches. The first approach used the conjugated diene peaks of the 2-7 Allo units at 6.07, 5.77 and 5.55 ppm (k,l,j) and the allylic H signals of the Allo units in 4-7 enchainment (f, 4.75-5.05 ppm), relative to the $CH_3$ proton peaks of the IB units (a, 1.15 ppm). The second approach used the signal at 3 ppm corresponding to proton g in structure III.

Table 1.1 summarizes the results; the two methods agree very well.

TABLE 1.1

Alloocimene content of the copolymer of Example 1.

| Method | Total IB [mol %] | Total Allo [mol %] | Conjugated diene (2-7) [mol %] | Non-conjugated diene (4-7) [mol %] |
|---|---|---|---|---|
| 1. | 95.41 | 4.59 | 0.02 | 4.57 |
| 2. | 95.83 | 4.17 | 0.02 | 4.14 |

Thus the copolymer of Example 1 contains 4.4 mol % (10.96 wt %) polyalloocimene.

Figure 4:
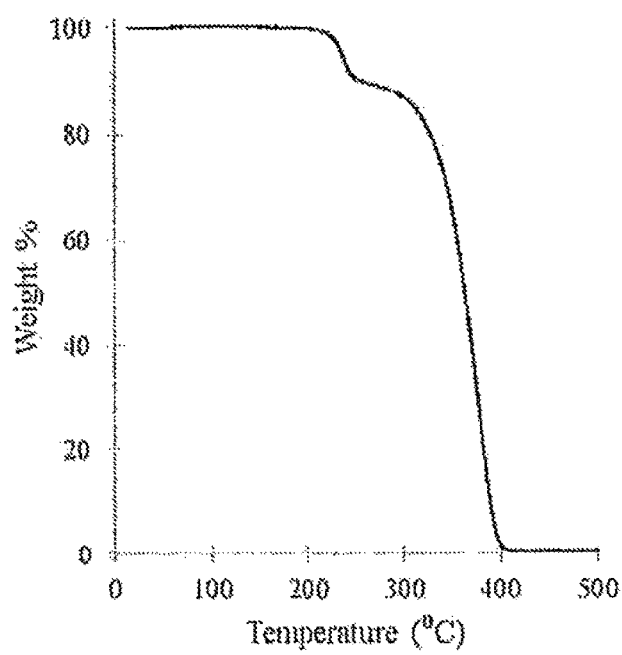
FIG. 4 relates to TGA trace of the copolymer of Example 1.

FIG. 4 displays the TGA trace. Decomposition starts above 200° C. The first step shows ~10 wt % weight loss, which closely corresponds to the 10.96 wt % allo content. The second step ends at 400° C. with complete decomposition of the polymer.

Figure 5:
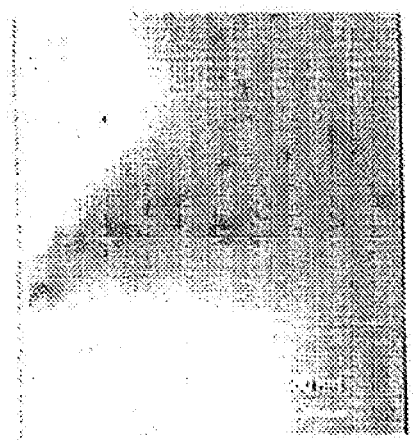
FIG. 5 relates to TEM of the copolymer of Example 1: solvent cast, stained

DSC showed two transitions: at −70° C. for PIB, and a weak transition at 74° C., most likely representing an alloocimene-rich block. TEM (FIG. 5) further supported the existence of a two-phase system.

Figure 6:
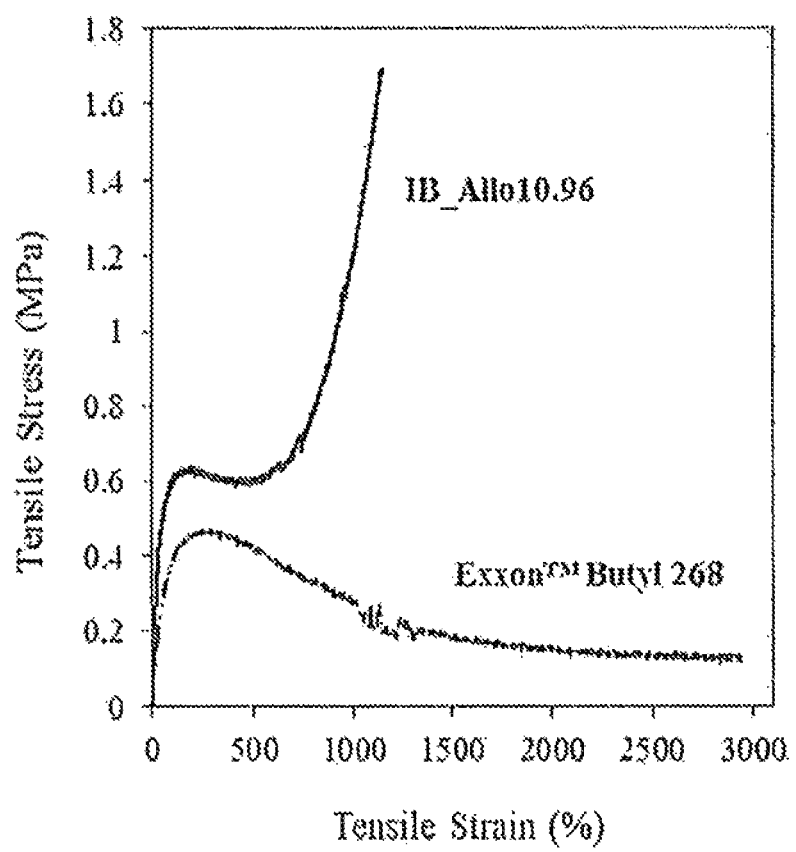
FIG. 6 relates to stress-strain plots of the copolymer of Example 1 and Exxon™ Butyl Rubber 268.

FIG. 6 compares the stress-strain plots of the copolymer of Example 1 and of Exxon™ Butyl Rubber 268. Surprisingly, the diblock copolymer sample exhibited strain hardening and thermoplastic elastomeric behavior!

Figure 7:
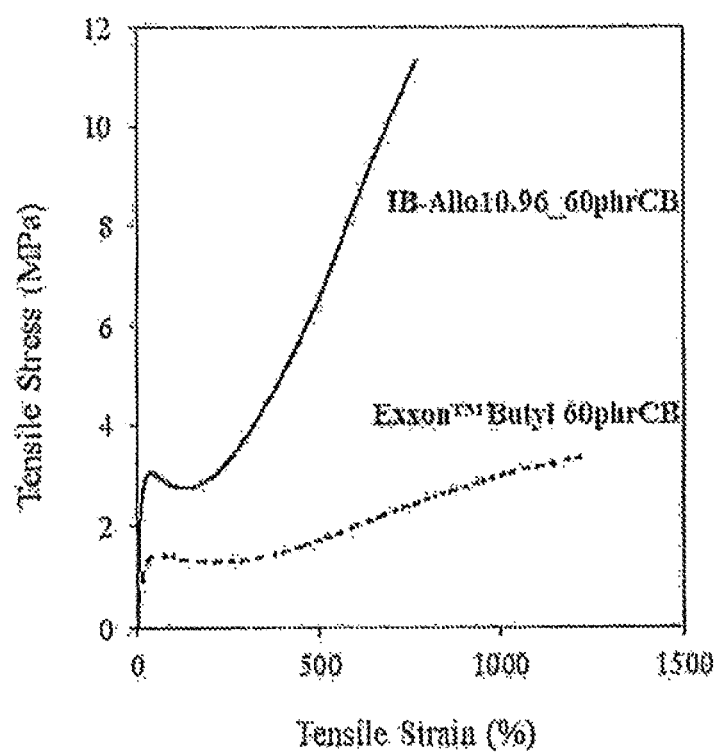
FIG. 7 relates to carbon black reinforcement.

Furthermore, the addition of 60 phr carbon black (N125) substantially reinforced the copolymer of Example 1 (FIG. 7). In comparison, the addition of 60 phr carbon black to Exxon™ Butyl Rubber 268 led to much less reinforcement.

EXAMPLE 2

Figure 8:
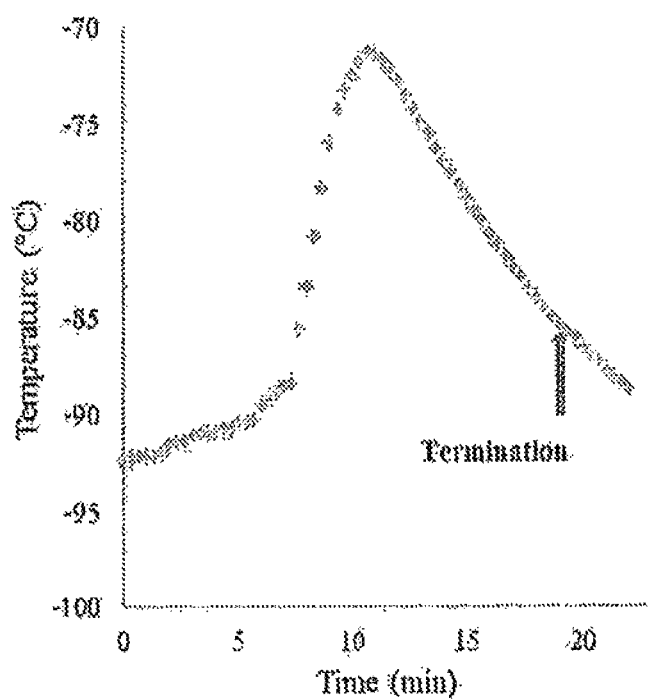
FIG. 8 relates to temperature profile during the polymerization.

1.7377 g (0.0130 mol) of $AlCl_3$ was added to 200 mL of MeCl to make a saturated solution. 890 mL (19.8067 mol, 1000 g) MeCl and 190 mL (2.4281 mol, 136.216 g) IB were condensed into graduated cylinders cooled in the hexane bath at minus 95° C. 17 mL (0.1012 mol, 13.786 g) Allo and 6 mL (0.06 mol, 4.086 g) isoprene (IP) were measured into graduated cylinders at room temperature. The reactants were added into a 3000 mL round bottom flask immersed in the cooling bath and stirred with and overhead stirrer at 270 rpm until the internal temperature probe showed minus 95° C. 5 mL catalyst solution was pipetted from the clear top phase and added to the reaction mixture while the temperature was monitored with a thermocouple. A total of 35 mL catalyst solution was added in 5mL portions (at 0; 1,6; 2.6; 3.6; 4.6; 5.5 and 7.3 minutes). Upon addition of the first increment the color of the mixture turned to yellow and as more catalyst was added the color changed to light red/brown. As the reaction progressed, and more catalyst was added, the color turned to dark red/brown, than light yellow than finally white. The temperature of the reaction mixture also increased as the polymerization progressed, reaching 21.1° C. temperature difference relative to the starting temperature (FIG. 8). After 18 minutes the reaction was terminated with 2×20 mL NaOH/methanol (0.5644 g (0.0140 mol) of NaOH in 100 mL of MeOH). The color of the mixture turned to white. The reactor was taken out from the dry box and was kept in a fume hood overnight to let the MeCl to evaporate. The rubber was dissolved in 1000 mL and precipitated in MeOH: 100 mL polymer solution was added dropwise to 500 mL MeOH with vigorous agitation. The yield was 109.3 g polymer after drying in a vacuum over for 5 days. Further drying, by compression molding yielded 69.09% conversion.

Figure 9:
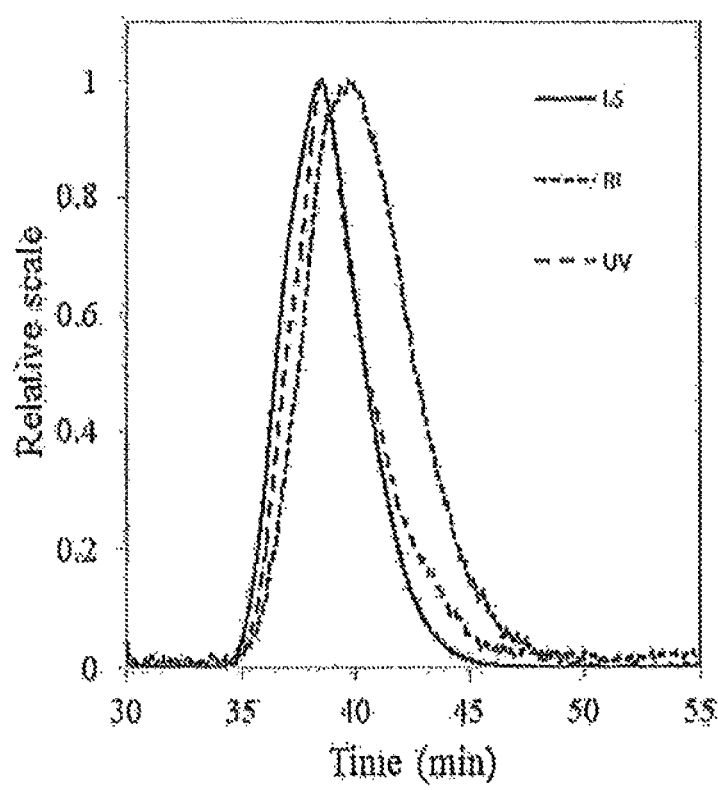
FIG. 9 relates to SEC traces of the copolymer of Example 2.

The SEC traces of the polymer of Example 2 are shown in FIG. 9. The polymer exhibited strong UV absorption at 240 nm across the whole distribution.

SEC analysis yielded $M_w$=326,000 g/mol, $M_n$=137,000 g/mol, $M_w/M_n$=2.37, $M_z$=565,000 g/mol and $R_z$=31.7 nm.

Figure 10:
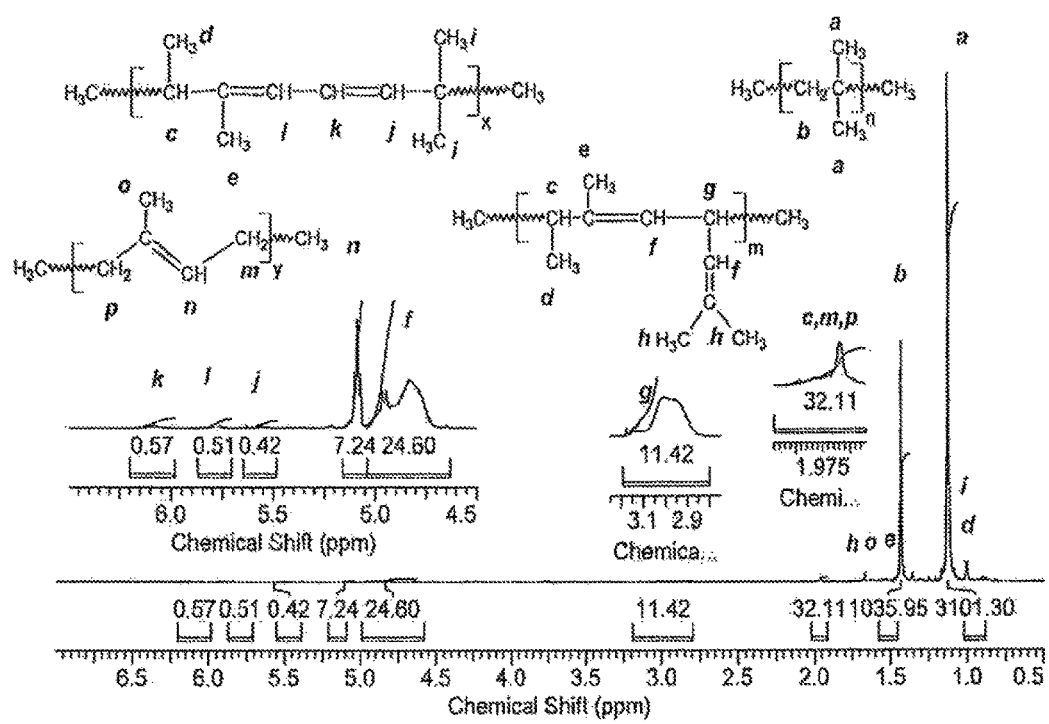
FIG. 10 relates to $^1$H NMR spectrum of the copolymer of Example 2.

FIG. 10 displays the $^1H$ NMR spectrum with the proposed structures. The main structure is the 4-7 enchainment (III in Scheme 1), and the conjugated diene structure corresponds to 2-7 enchainment (IV in Scheme 1), in contrast to structure I found by Marvel. The alloocimene content of the copolymer was calculated using two different approaches. The first approach used the conjugated diene peaks of the 2-7 Allo units at 6.07, 5.77 and 5.55 ppm (k,l,j) and the allylic H signals of the Allo units in 4-7 enchainment (f, 4.75-5.05 ppm), relative to the $CH_3$ proton peaks of the IB units (a, 1.15 ppm). The second approach used the signal at 3 ppm corresponding to proton g in structure III.

Table 2.1 summarizes the results; the two methods agree very well. The IP content was calculated from the signal at 5.1 ppm.

TABLE 2.1

Alloocimene and IP content of the copolymer of Example 2.

| Method | Total IB [mol %] | Total IP [mol %] | Total Allo [mol %] | Conjugated diene (2-7) [mol %] | Non-conjugated diene (4-7) [mol %] |
|---|---|---|---|---|---|
| 1. | 92.89 | 1.17 | 5.95 | 0.17 | 5.75 |
| 2. | 93.04 | 1.17 | 5.79 | 0.17 | 5.62 |

Thus the copolymer of Example 2 contains 5.8 mol % (13.28 wt %) alloocimene and 1.17 mol % (1.3 wt %) IP.

Figure 11:
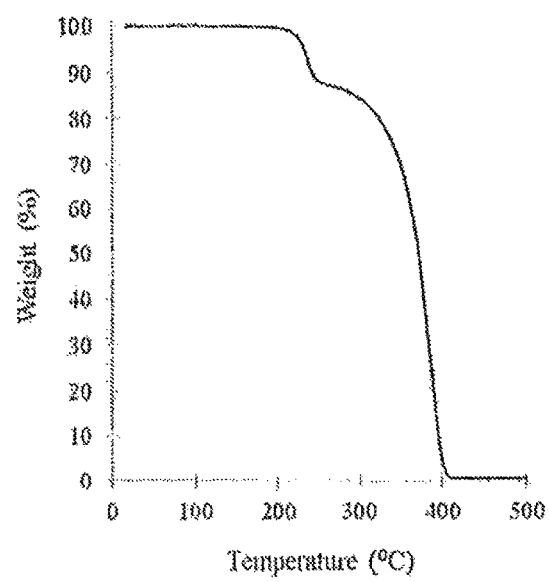
FIG. 11 relates to TGA trace of the copolymer of Example 2.

FIG. 11 displays the TGA trace. Decomposition starts above 200° C. The first step shows ~13 wt % weight loss, which closely corresponds to the 13.28 wt % allo content. The second step ends at 400° C. with complete decomposition of the polymer.

Figure 12:
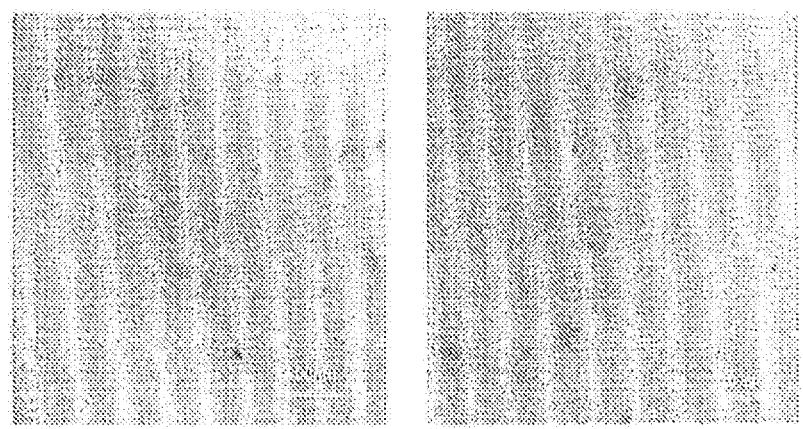
FIG. 12 relates to TEM of the copolymer of Example 2: solvent cast, stained.

DSC showed two transitions: at −70° C. for PIB, and a weak transition at 71° C., most likely representing an alloocimene-rich block. TEM (FIG. 12) further supported the existence of a two-phase system.

Figure 13:
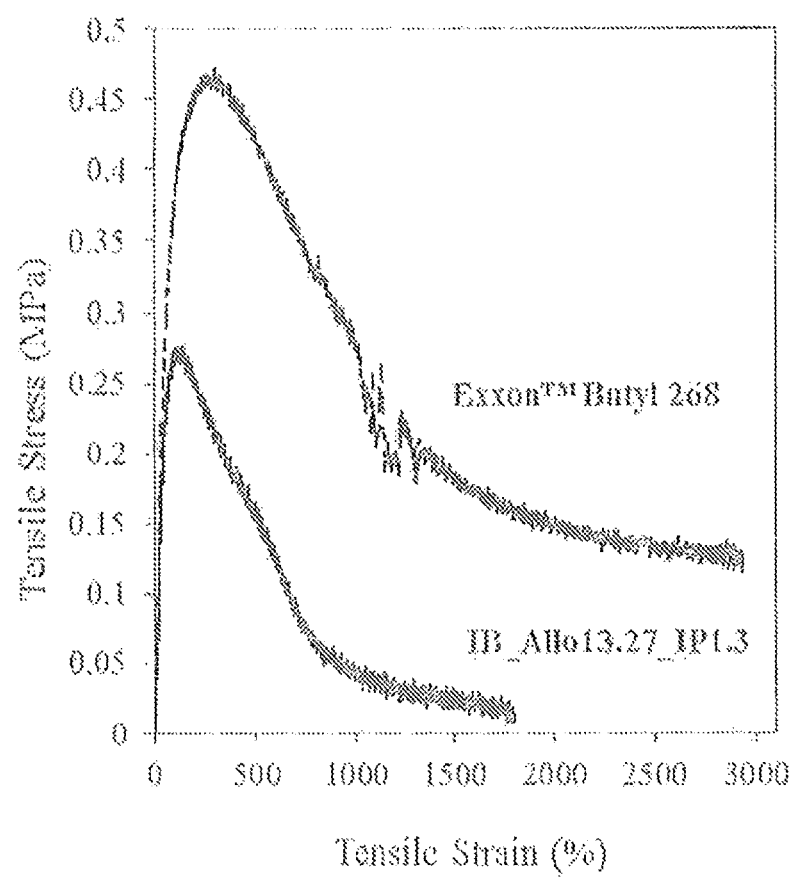
FIG. 13 relates to stress-strain plots of the copolymer of Example 2 and Exxon™ Butyl Rubber 268.

FIG. 13 compares the stress-strain plots of the copolymer of Example 2 and of Exxon™ Butyl Rubber 268.

Figure 14:
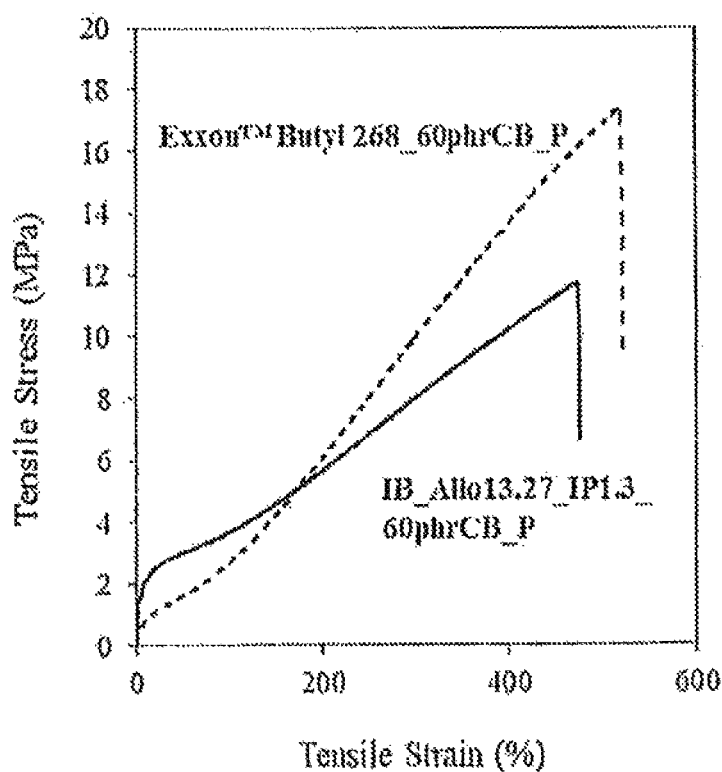
FIG. 14 relates to sulfur cured compounds.

The addition of 60 phr carbon black (N125) did not reinforce the copolymer of Example 2, see FIG. 14. However, a standard cure recipe yielded tensile properties close to that of cured Exxon™ Butyl Rubber 268.

EXAMPLE 3

Figure 15:
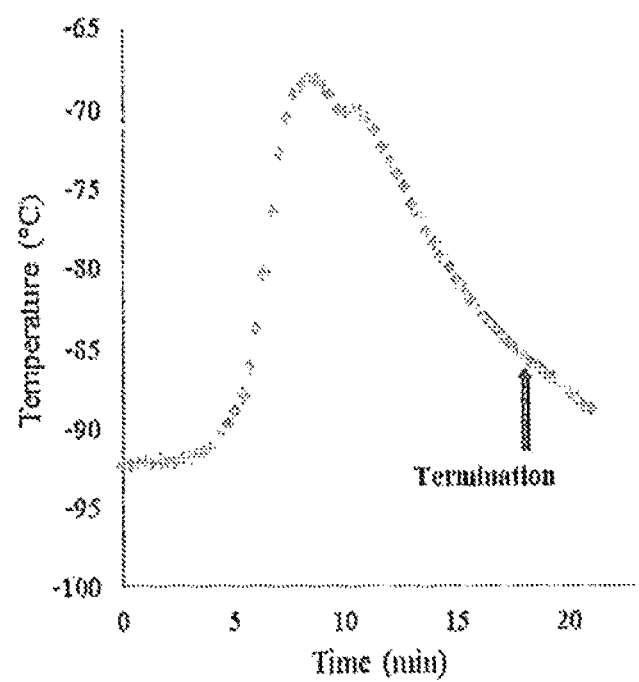
FIG. 15 relates to temperature profile during the polymerization.

1.7377 g (0.0130 mol) of $AlCl_3$ was added to 200mL of MeCl to make a saturated solution. 885 mL (19.7025 mol, 994.74 g) MeCl and 190 mL (2.4281 mol, 136.216 g) IB were condensed into graduated cylinders cooled in the hexane bath at minus 95° C. 8.3 mL (0.0494 mol, 6.7313 g) Allo and 6 mL (0.06 mol, 4.086 g) isoprene (IP) were measured into graduated cylinders at room temperature. The reactants were added into a 3000 mL round bottom flask immersed in the cooling bath and stirred with and overhead stirrer at 270 rpm until the internal temperature probe showed minus 95° C. 5 mL catalyst solution was pipetted from the clear top phase and added to the reaction mixture while the temperature was monitored with a thermocouple. A total of 30 mL catalyst solution was added in 5 mL portions (0; 0.7; 1.66; 2.6; 4.33 and 5.66 minutes). Upon addition of the first increment the color of the mixture turned to yellow and as more catalyst was added the color changed to light red/brown. As the reaction progressed, and more catalyst was added, the color turned to dark red/brown, than light yellow than finally white. The temperature of the reaction mixture also increased as the polymerization progressed, reaching 24.1° C. temperature difference relative to the starting temperature (FIG. 15). After 18 minutes the reaction was terminated with 2×20 mL NaOH/methanol (0.5644 g (0.0140 mol) of NaOH in 100 mL of MeOH). The color of the mixture turned to white. The reactor was taken out from the dry box and was kept in a fume hood overnight to let the MeCl to evaporate. The rubber was dissolved in 1000 mL and precipitated in MeOH: 100 mL polymer solution was added dropwise to 500 mL MeOH with vigorous agitation. The yield was 127.3 g polymer after drying in a vacuum over for 5 days. Further drying, by compression molding, yielded 81.83% conversion.

Figure 16:
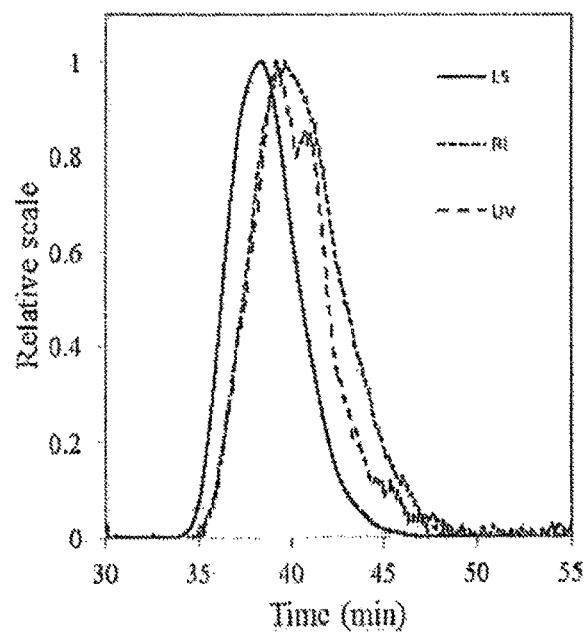
FIG. 16 relates to SEC traces of the copolymer of Example 3.

The SEC traces of the polymer of Example 3 are shown in FIG. 16. The polymer exhibited strong UV absorption at 240 nm across the whole distribution.

SEC analysis yielded $M_w$=323,000 g/mol, $M_n$=128,000 g/mol, $M_w/M_n$=2.53, $M_z$=652,000 g/mol and $R_z$=31.3 nm.

Figure 17:
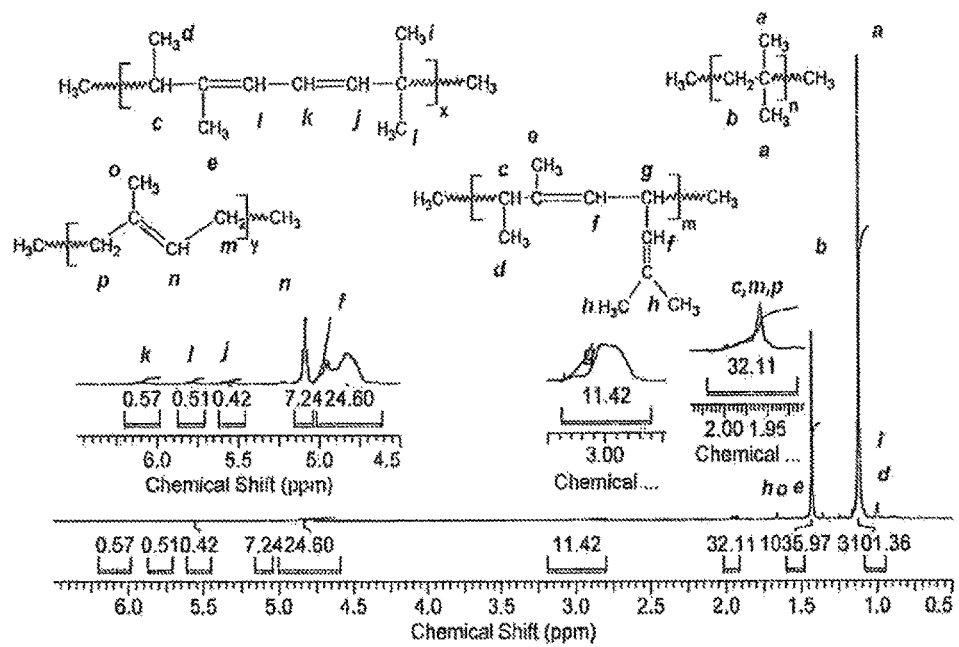
FIG. 17 relates to $^1$H NMR spectrum of the copolymer of Example 3.

FIG. 17 displays the $^1$H NMR spectrum with the proposed structures. The main structure is the 4-7 enchainment (III in Scheme 1), and the conjugated diene structure corresponds to 2-7 enchainment (IV in Scheme 1), in contrast to structure I found by Marvel. The alloocimene content of the copolymer was calculated using two different approaches. The first approach used the conjugated diene peaks of the 2-7 Allo units at 6.07, 5.77 and 5.55 ppm (k,l,j) and the allylic H signals of the Allo units in 4-7 enchainment (f, 4.75-5.05 ppm), relative to the $CH_3$ proton peaks of the IB units (a, 1.15 ppm). The second approach used the signal at 3 ppm corresponding to proton g in structure III.

Table 3.1 summarizes the results; the two methods agree very well. The IP content was calculated from the signal at 5.1 ppm.

TABLE 3.1

Alloocimene and IP content of the copolymer of Example 3.

| Method | Total IB [mol %] | Total IP [mol %] | Total Allo [mol %] | Conjugated diene (2-7) [mol %] | Non-conjugated diene (4-7) [mol %] |
|---|---|---|---|---|---|
| 1. | 96.27 | 1.35 | 2.38 | 0.09 | 2.29 |
| 2. | 96.43 | 1.35 | 2.22 | 0.09 | 2.13 |

Thus the copolymer of Example 3 contains 2.3 mol % (5.58 wt %) alloocimene and 1.17 mol % (1.58 wt %) IP.

Figure 18:
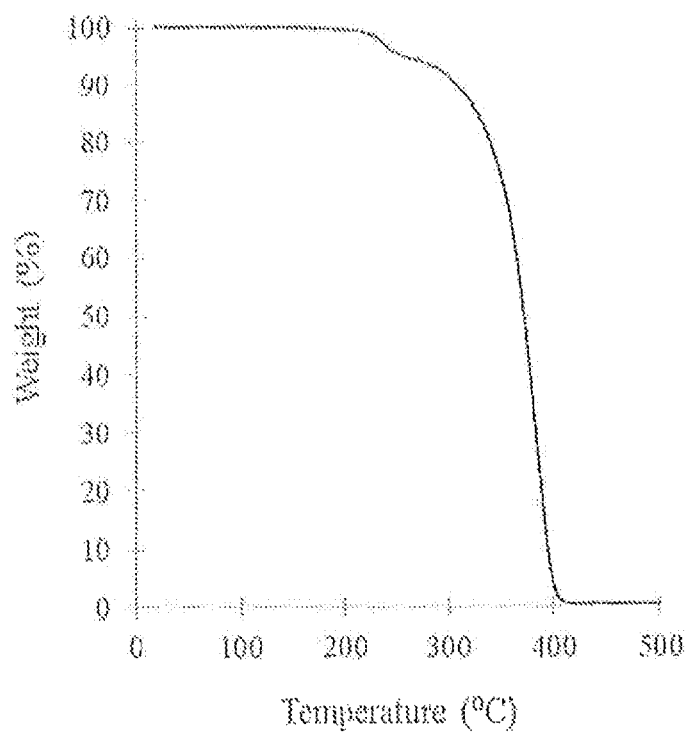
FIG. 18 relates to TGA trace of the copolymer of Example 3.

FIG. 18 displays the TGA trace. Decomposition starts above 200° C. The first step shows ~5 wt % weight loss, which closely corresponds to the 5.58 wt % Allo content. The second step ends at 400° C. with complete decomposition of the polymer.

Figure 19:
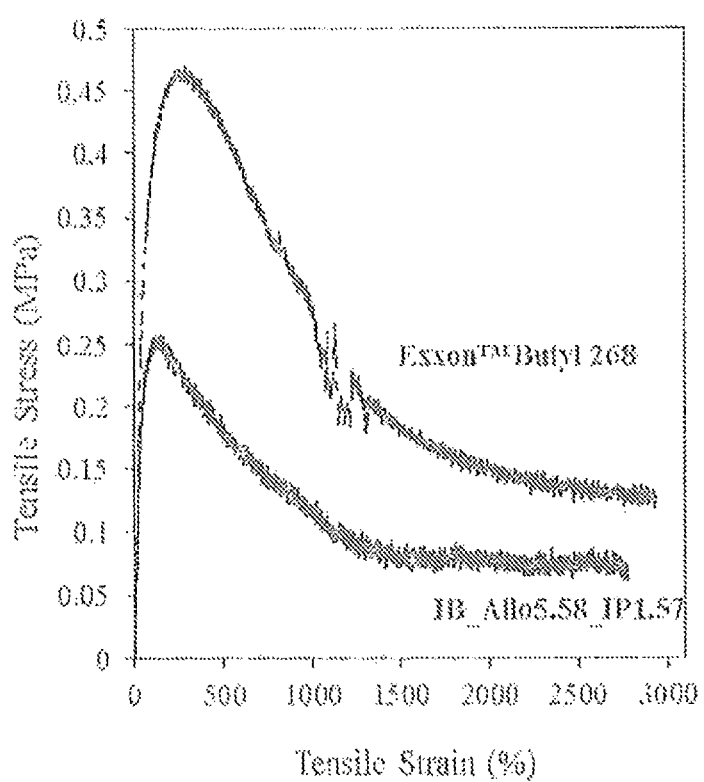
FIG. 19 relates to stress-strain plots of the copolymer of Example 3 and Exxon™ Butyl Rubber 268.

FIG. 19 compares the stress-strain plots of the copolymer of Example 3 and of Exxon™ Butyl Rubber 268.

Figure 20:
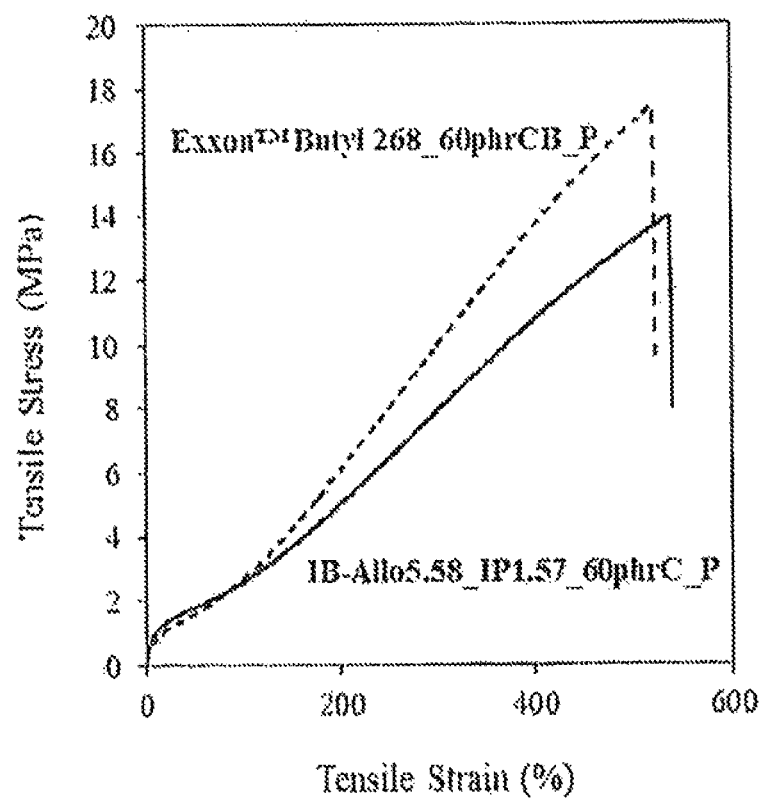
FIG. 20 relates to sulfur cured compounds.

The addition of 60 phr carbon black (N125) did not reinforce the copolymer of Example 3. However, a standard cure recipe yielded tensile properties close to that of cured Exxon™ Butyl Rubber 268, see FIG. 20.

EXAMPLE 4

Figure 21:
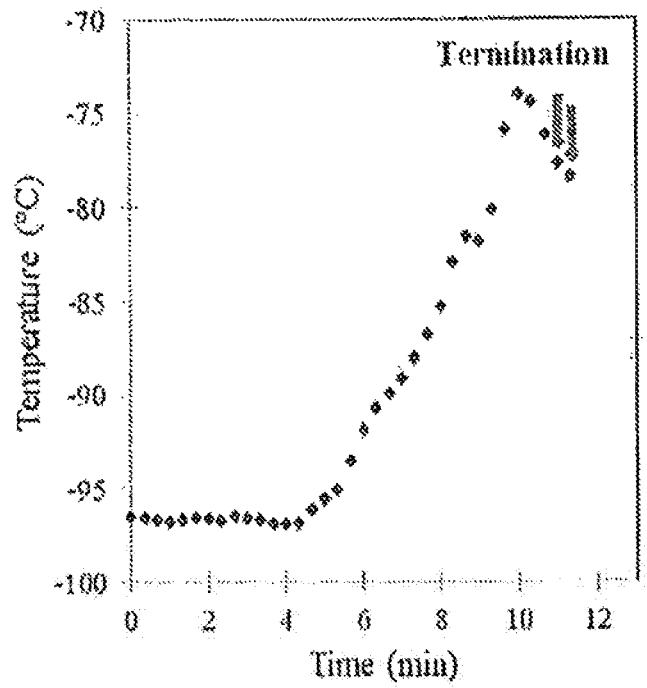
FIG. 21 relates to temperature profile during the polymerization.

2.140 g (0.01605 mol) of $AlCl_3$ was added to 200 mL of MeCl to make a saturated solution. 670 mL (14.916 mol, 783.08 g) MeCl and 148 mL (1.8968 mol, 106.412 g) IB were condensed into graduated cylinders cooled in the hexane bath at minus 95° C. 12.4 mL (0.0738 mol, 10.0564 g) Allo was measured into a 25 mL graduated cylinder at room temperature. The reactants were added into a 3000 mL round bottom flask immersed in the cooling bath and stirred with an overhead stirrer at 250 rpm until the internal temperature probe showed minus 95° C. 5 mL catalyst solution was pipetted from the clear top phase and added to the reaction mixture while the temperature was monitored with a thermocouple. A total of 25 mL catalyst solution was added in 5 mL portions. Upon addition of the first increment the color of the mixture turned to yellow and as more catalyst was added the color changed to light red/brown. As the reaction progressed, and more catalyst was added, the color turned to dark red/brown, than light yellow than finally white. The temperature of the reaction mixture also increased as the polymerization progressed, reaching 22.4° C. temperature difference relative to the starting temperature (FIG. 21). After 11.3 minutes the reaction was terminated with 40 mL NaOH/methanol (0.5009 g (0.0125 mol) of NaOH in 100 mL of MeOH). The color of the mixture turned to white, with large polymer chunks stuck onto the stirring shaft and blade and the temperature probe. The reactor was taken out from the dry box and 500 mL of hexane was added. The large piece of precipitated polymer dissolved in approximately 3-4 minutes. The mixture was kept in a fume hood overnight to let the MeCl to evaporate. A semi-transparent, viscous liquid remained after the evaporation. An additional 1000 mL hexane was added to the mixture and the polymer was precipitated in MeOH: 100 mL polymer solution was added dropwise to 500 mL MeOH with vigorous agitation. The yield was 102.82 g polymer after drying in by compression molding, with 0.82 g/116.46 g*100=88.28% conversion.

Figure 22:
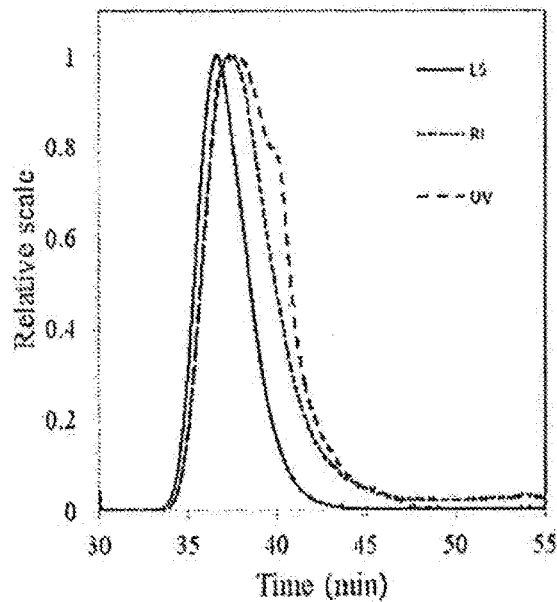
FIG. 22 relates to SEC traces of the copolymer of Example 4.

The SEC traces of the polymer of Example 4 are shown in FIG. 22. The polymer exhibited strong UV absorption at 240 nm across the whole distribution.

SEC analysis yielded $M_w$=600,000 g/mol, $M_n$=286,000 g/mol, $M_w/M_n$=2.1, $M_z$=897,000 g/mol and $R_z$=43.0 nm.

Figure 23:
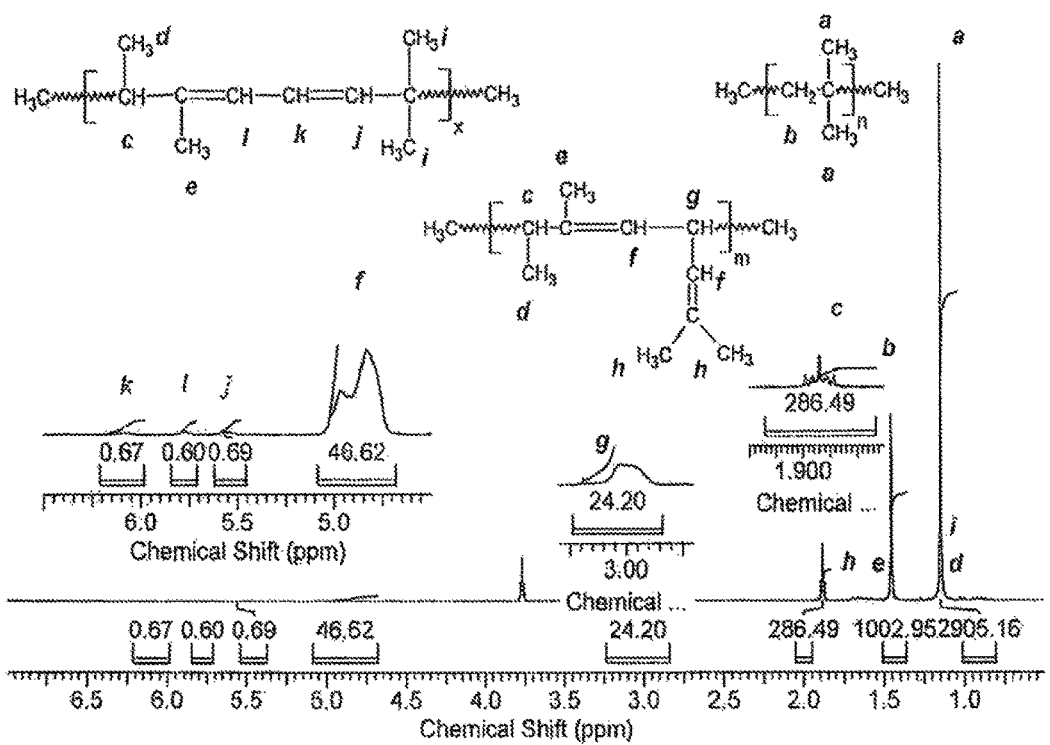
FIG. 23 relates to $^1$H NMR spectrum of the copolymer of Example 4.

FIG. 23 displays the $^1$H NMR spectrum with the proposed structures. The main structure is the 4-7 enchainment (III in Scheme 1). However, the conjugated diene structure corresponds to 2-7 enchainment (IV in Scheme 1), in contrast to structure I found by Marvel. The alloocimene content of the copolymer was calculated using two different approaches. The first approach used the conjugated diene peaks of the 2-7 Allo units at 6.07, 5.77 and 5.55 ppm (k,l,j) and the allylic H signals of the Allo units in 4-7 enchainment (f, 4.75-5.05 ppm), relative to the $CH_3$ proton peaks of the IB units (a, 1.15 ppm). The second approach used the signal at 3 ppm corresponding to proton g in structure III.

Table 4.1 summarizes the results; the two methods agree very well.

TABLE 4.1

Alloocimene content of the copolymer of Example 4.

| Method | Total IB [mol %] | Total Allo [mol %] | Conjugated diene (2-7) [mol %] | Non-conjugated diene (4-7) [mol %] |
|---|---|---|---|---|
| 1. | 95.28 | 4.72 | 0.13 | 4.59 |
| 2. | 95.12 | 4.88 | 0.13 | 4.75 |

Thus the copolymer of Example 4 contains 4.67 mol % (10.71 wt %) polyalloocimene.

Figure 24:
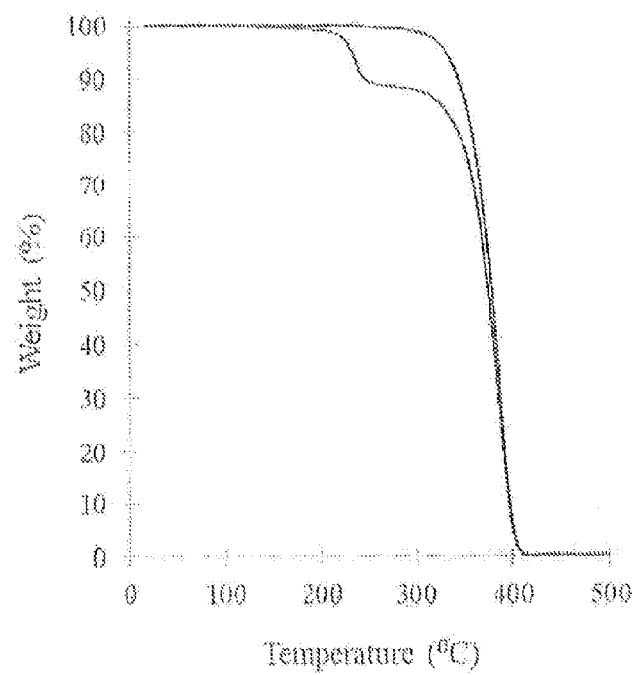
FIG. 24 relates to TGA trace of the copolymer of Example 4 and Exxon™ Butyl Rubber 268.

FIG. 24 displays the TGA traces of the newly synthesized polymer and Exxon™ Butyl Rubber 268. Decomposition starts above 200° C. for the polymer, whereas for Exxon™ Butyl Rubber 268 above 320° C. The first step shows ~10wt % weight loss, which closely corresponds to the 10.71 wt % Allo content. The second step ends at 400° C. with complete decomposition of the polymer.

Figure 25:
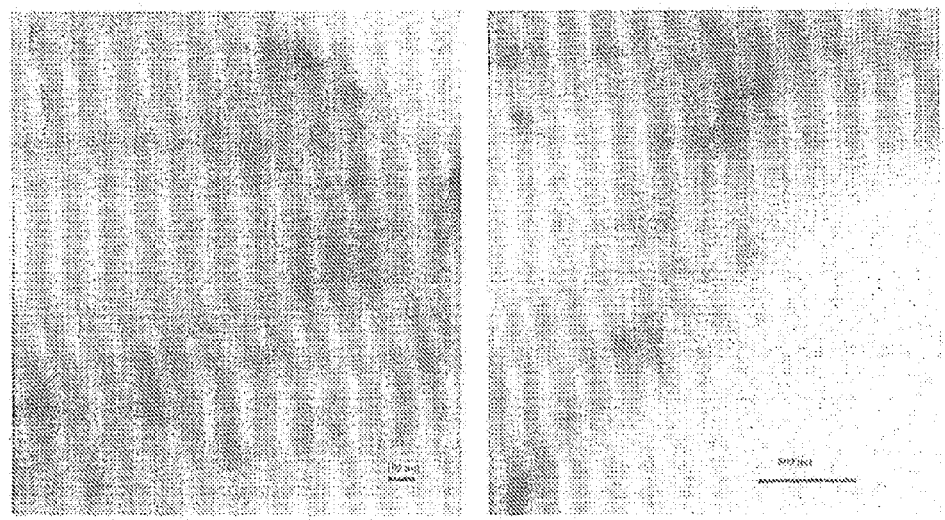
FIG. 25 relates to TEM of the copolymer of Example 1: solvent cast, stained.

TEM (FIG. 25) further supported the existence of a two-phase system.

Figure 26:
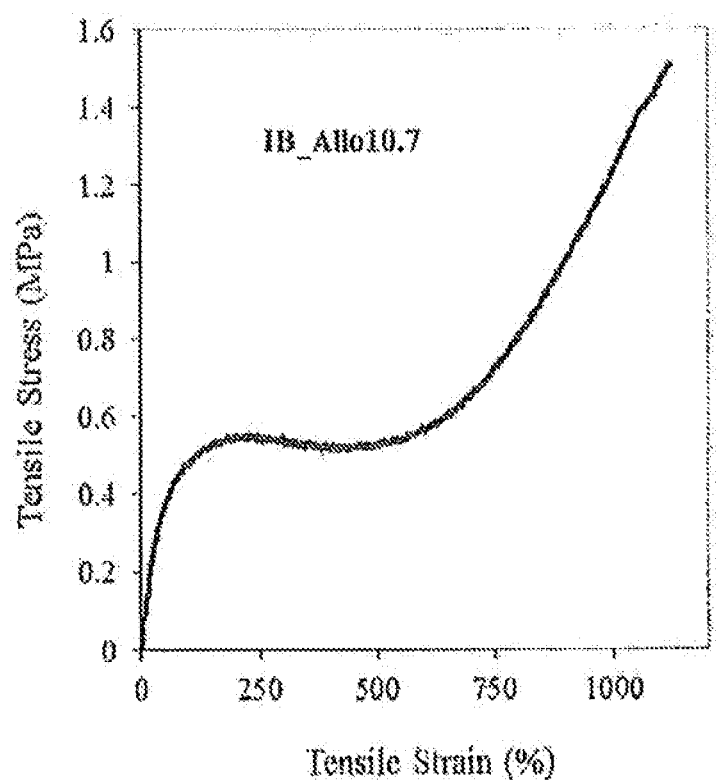
FIG. 26 relates to stress-strain plots of the copolymer of Example 4.

FIG. 26 compares the stress-strain plots of the copolymer of Example 4. Surprisingly, the diblock copolymer sample exhibited strain hardening and thermoplastic elastomeric behavior!

EXAMPLE 5

Figure 27:
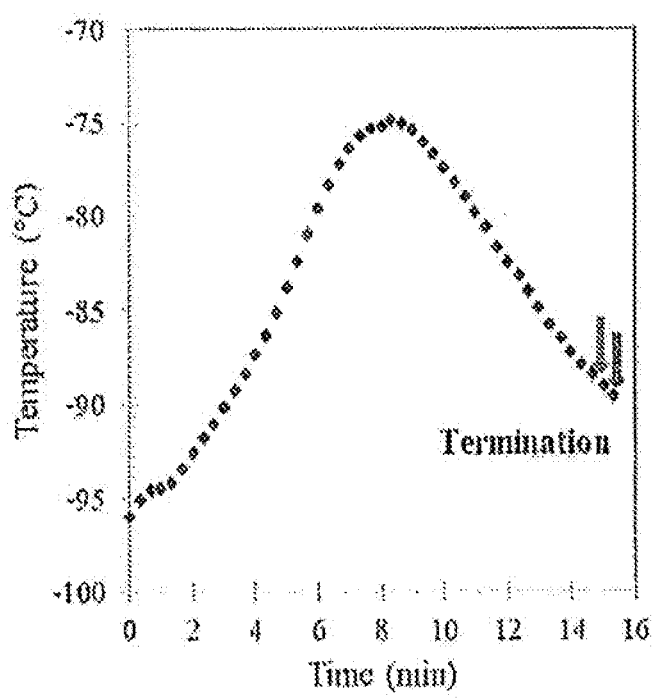
FIG. 27 relates to temperature profile during the polymerization.

2.140 g (0.01605 mol) of $AlCl_3$ was added to 200 mL of MeCl to make a saturated solution. 670 mL (14.916 mol, 783.08 g) MeCl and 144 mL (1.8455 mol, 103.536 g) IB were condensed into graduated cylinders cooled in the hexane bath at minus 95° C. 12.4 mL (0.0738 mol, 10.0564 g) Allo was measured into a 25 mL graduated cylinder at room temperature. The reactants were added into a 3000 mL round bottom flask immersed in the cooling bath and stirred with an overhead stirrer at 250 rpm until the internal temperature probe showed minus 95° C. 25 mL catalyst solution from the clear top phase was added to the reaction mixture while the temperature was monitored with a thermocouple. Upon catalyst addition the color of the mixture turned to yellow and during the polymerization it turned red/brown, dark red. Light brown, brown/yellowish and gray/yellowish. The temperature of the reaction mixture also increased as the polymerization progressed, reaching 21.2° C. temperature difference relative to the starting temperature (FIG. 27). After 15 minutes the reaction was terminated with 40 mL NaOH/methanol (0.5009 g (0.0125 mol) of NaOH in 100mL of MeOH). The color of the mixture turned to white. The reactor was taken out from the dry box and 500mL of hexane was added. The mixture was kept in a fume hood overnight to let the MeCl to evaporate. A semi-transparent, viscous liquid remained after the evaporation. An additional 1000 mL hexane was added to the mixture and the polymer was precipitated in MeOH: 100 mL polymer solution was added dropwise to 500 mL MeOH with vigorous agitation. The yield was 96.36 g polymer after drying by compression molding, with 96.36 g/113.59 g*100=84.82% conversion.

Figure 28:
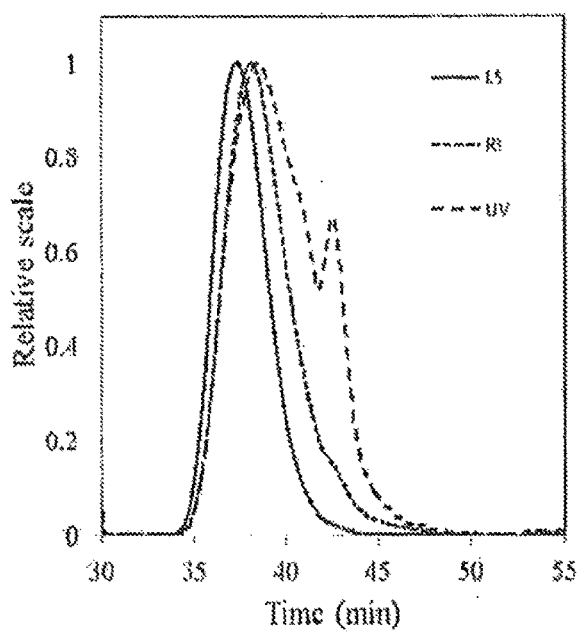
FIG. 28 relates to SEC traces of the copolymer of Example 5.

The SEC traces of the polymer of Example 5 are shown in FIG. 28. The polymer exhibited strong UV absorption at 240 nm across the whole distribution.

SEC analysis yielded $M_w$=456,000 g/mol, $M_n$=261,000 g/mol, $M_w/M_n$=1.75, $M_z$=641,000 g/mol and $R_z$=35.0 nm.

Figure 29:
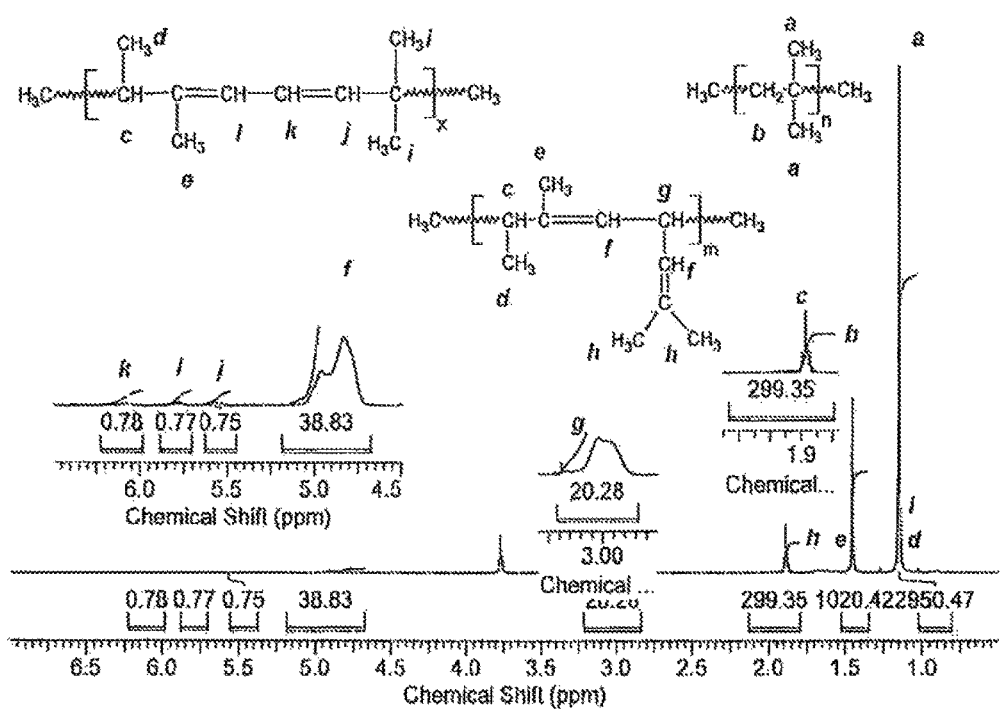
FIG. 29 relates to $^1$H NMR spectrum of the copolymer of Example 5.

FIG. 29 displays the $^1H$ NMR spectrum with the proposed structures. The main structure is the 4-7 enchainment (III in Scheme 1). However, the conjugated diene structure corresponds to 2-7 enchainment (IV in Scheme 1), in contrast to structure I found by Marvel. The alloocimene content of the copolymer was calculated using two different approaches. The first approach used the conjugated diene peaks of the 2-7 Allo units at 6.07, 5.77 and 5.55 ppm (k,l,j) and the allylic H signals of the Allo units in 4-7 enchainment (f, 4.75-5.05 ppm), relative to the $CH_3$ proton peaks of the IB units (a, 1.15 ppm). The second approach used the signal at 3 ppm corresponding to proton g in structure III.

Table 5.1 summarizes the results; the two methods agree very well.

TABLE 5.1

Alloocimene content of the copolymer of Example 5.

| Method | Total IB [mol %] | Total Allo [mol %] | Conjugated diene (2-7) [mol %] | Non-conjugated diene (4-7) [mol %] |
|---|---|---|---|---|
| 1. | 96.06 | 3.94 | 0.15 | 3.79 |
| 2. | 95.90 | 4.10 | 0.15 | 3.95 |

Thus the copolymer of Example 5 contains 4.01 mol % (9.05 wt %) polyalloocimene.

Figure 30:
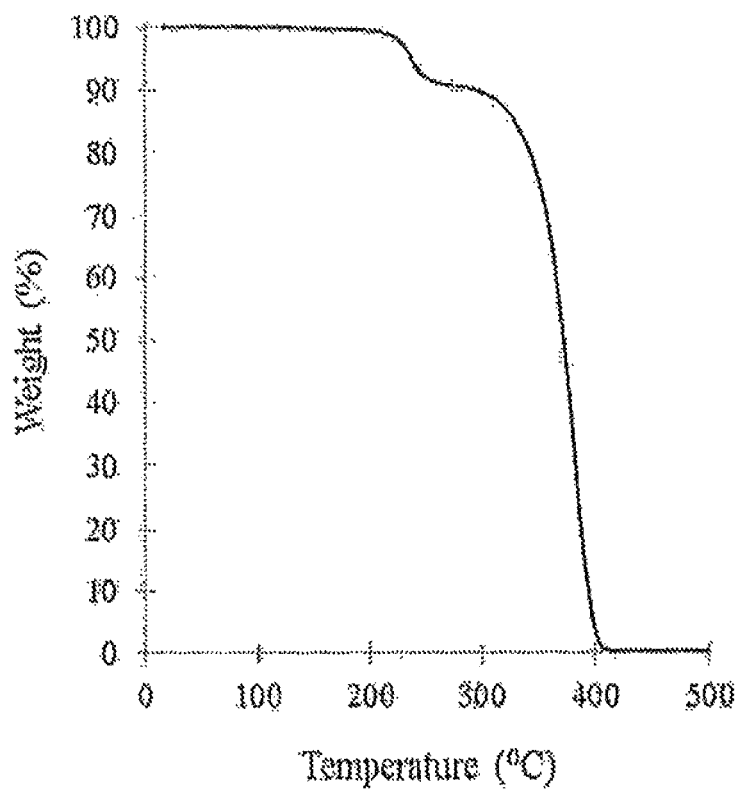
FIG. 30 relates to TGA trace of the copolymer of Example 5.

FIG. 30 displays the TGA traces. Decomposition starts above 200° C. for the polymer. The first step shows ~10 wt % weight loss, which closely corresponds to the 9.05 wt % Allo content. The second step ends at 400° C. with complete decomposition of the polymer.

Figure 31:
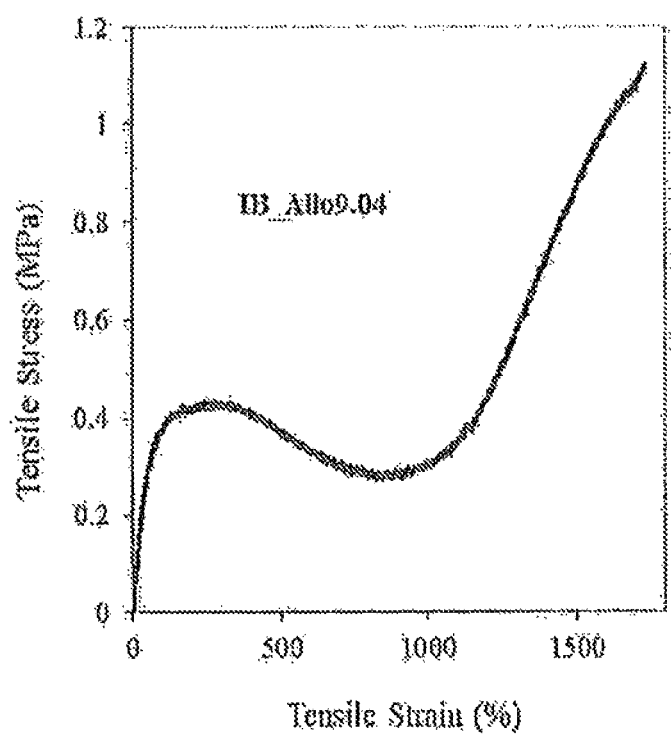
FIG. 31 relates to stress-strain plots of the copolymer of Example 5.

FIG. 31 compares the stress-strain plots of the copolymer of Example 5. Surprisingly, the diblock copolymer sample exhibited strain hardening and thermoplastic elastomeric behavior.

EXAMPLE 6

Figure 32:
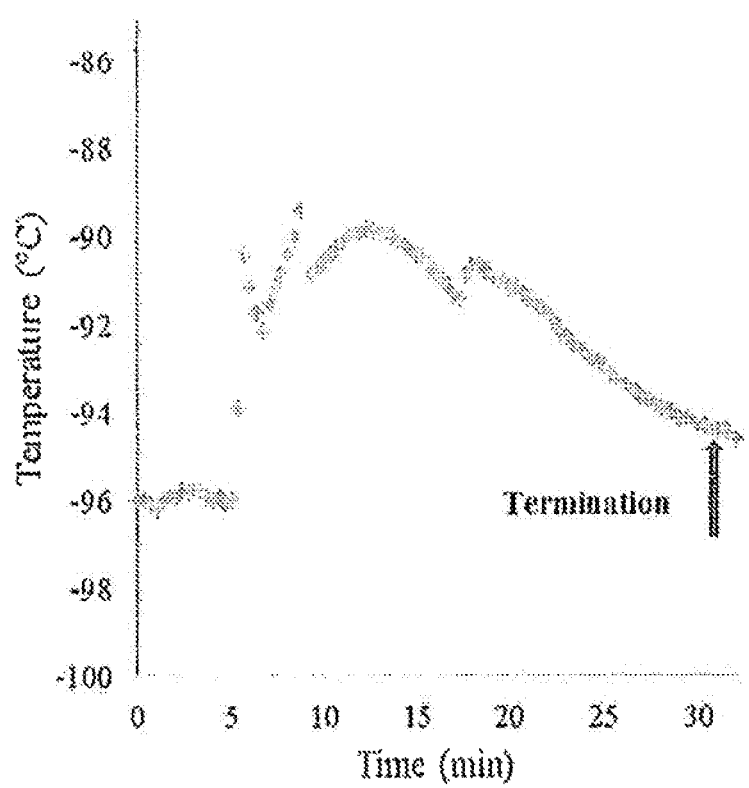
FIG. 32 relates to temperature profile during the polymerization.

2.170 g (0.0163 mol) of $AlCl_3$ was added to 200 mL of MeCl to make a saturated solution. 890 mL (19.8138 mol, 1000.36 g) MeCl and 190 mL (2.4351 mol, 136.61 g) IB were condensed into graduated cylinders cooled in the hexane bath at minus 95° C. 16.4 mL (0.0977 mol, 13.3004 g) Allo was measured into a 25 mL graduated cylinder at room temperature. The reactants were added into a 3000 mL round bottom flask immersed in the cooling bath and stirred with an overhead stirrer at 270 rpm until the internal temperature probe showed minus 95° C. 5 mL catalyst solution was pipetted from the clear top phase and added to the reaction mixture while the temperature was monitored with a thermocouple. A total of 40 mL catalyst solution was added in 5 mL portions. Upon addition of the first increment the color of the mixture turned to yellow and as more catalyst was added the color changed to light red/brown. As the reaction progressed, and more catalyst was added, the color turned to dark red/brown, than light yellow than finally white. The temperature of the reaction mixture also increased as the polymerization progressed, reaching 6.6° C. temperature difference relative to the starting temperature (FIG. 32). After 31 minutes the reaction was terminated with 40 mL NaOH/methanol (0.47 g (0.0118 mol) of NaOH in 100 mL of MeOH). The color of the mixture turned to white, with large polymer chunks stuck onto the stirring shaft and blade and the temperature probe. The reactor was taken out from the dry box and 500 mL of hexane was added. The mixture was kept in a fume hood overnight to let the MeCl to evaporate. A semi-transparent, viscous liquid remained after the evaporation. An additional 1000 mL hexane was added to the mixture and the polymer was precipitated in MeOH: 100 mL polymer solution was added dropwise to 500 mL MeOH with vigorous agitation. The yield was 92.46 g polymer after drying by compression molding, with 92.46 g/149.91*100=61.68% conversion.

Figure 33:
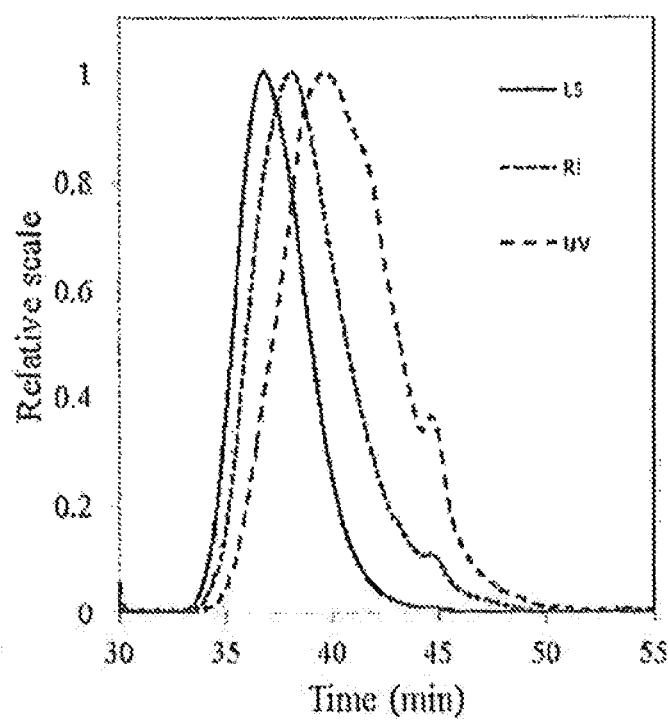
FIG. 33 relates to SEC traces of the copolymer of Example 6.

The SEC traces of the polymer of Example 6 are shown in FIG. 33. The polymer exhibited strong UV absorption at 240 nm across the whole distribution.

SEC analysis yielded $M_w$=497,000 g/mol, $M_n$=224,000 g/mol, $M_w/M_n$=2.23, $M_z$=845,000 g/mol and $R_z$=41.6 nm.

Figure 34:
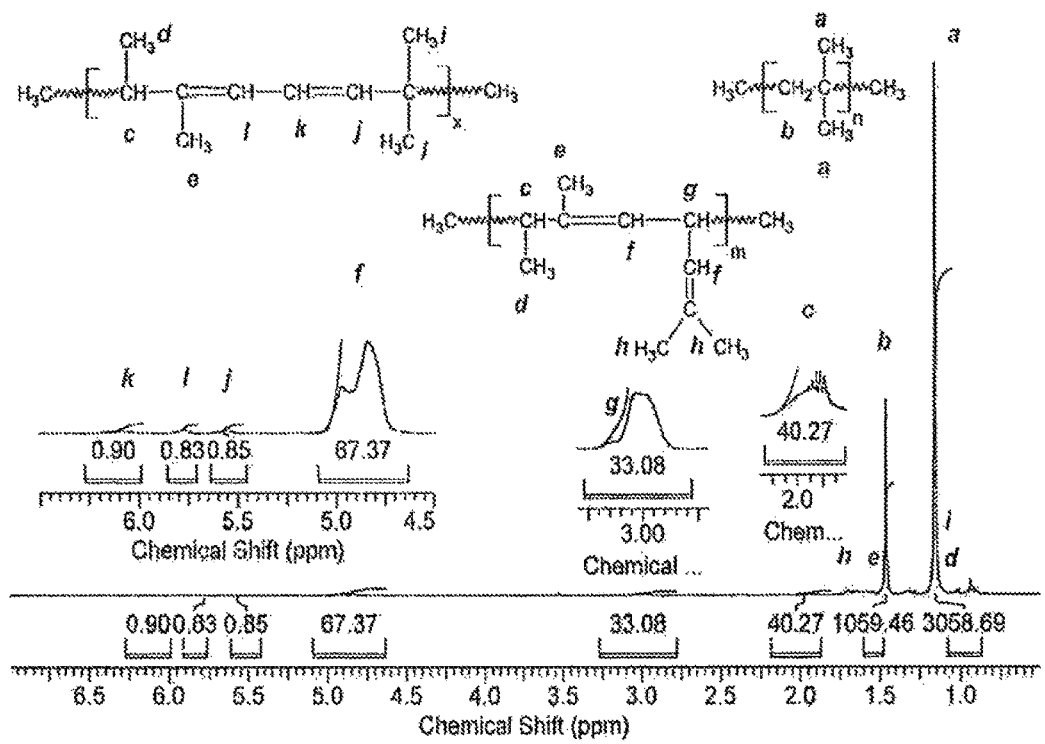
FIG. 34 relates to $^1$H NMR spectrum of the copolymer of Example 6.

FIG. 34 displays the $^1$H NMR spectrum with the proposed structures. The main structure is the 4-7 enchainment (III in Scheme 1). However, the conjugated diene structure corresponds to 2-7 enchainment (IV in Scheme 1), in contrast to structure I found by Marvel. The alloocimene content of the copolymer was calculated using two different approaches. The first approach used the conjugated diene peaks of the 2-7 Allo units at 6.07, 5.77 and 5.55 ppm (k,l,j) and the allylic H signals of the Allo units in 4-7 enchainment (f, 4.75-5.05 ppm), relative to the $CH_3$ proton peaks of the IB units (a, 1.15 ppm). The second approach used the signal at 3 ppm corresponding to proton g in structure III.

Table 6.1 summarizes the results; the two methods agree very well.

TABLE 6.1

Alloocimene content of the copolymer of Example 6.

| Method | Total IB [mol %] | Total Allo [mol %] | Conjugated diene (2-7) [mol %] | Non-conjugated diene (4-7) [mol %] |
|---|---|---|---|---|
| 1. | 93.65 | 6.35 | 0.16 | 6.19 |
| 2. | 93.76 | 6.24 | 0.16 | 6.08 |

Thus the copolymer of Example 6 contains 6.15 mol % (14.03 wt %) polyalloocimene.

Figure 35:
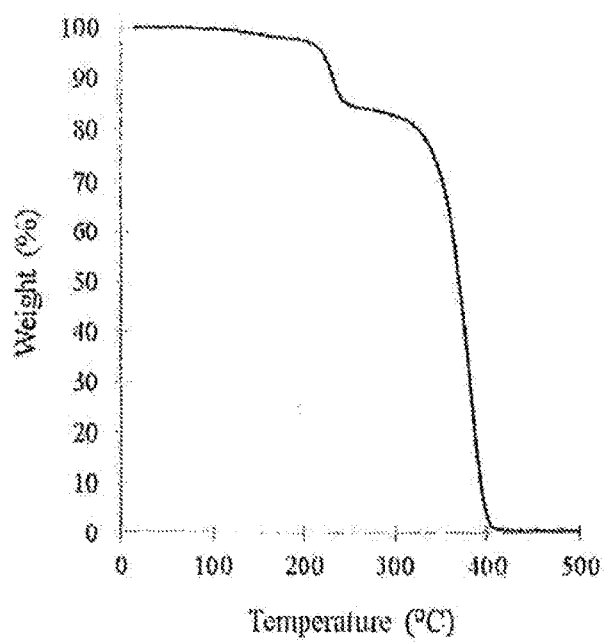
FIG. 35 relates to TGA trace of the copolymer of Example 6.

FIG. 35 displays the TGA traces. Decomposition starts above 200° C. for the polymer. The first step shows ~15wt % weight loss, which closely corresponds to the 14.05 wt % Allo content. The second step ends at 400° C. with complete decomposition of the polymer.

DSC showed two transitions: at −67.1° C. for PIB, and a weak transition at 67.2° C., most likely representing an alloocimene-rich block.

Figure 36:
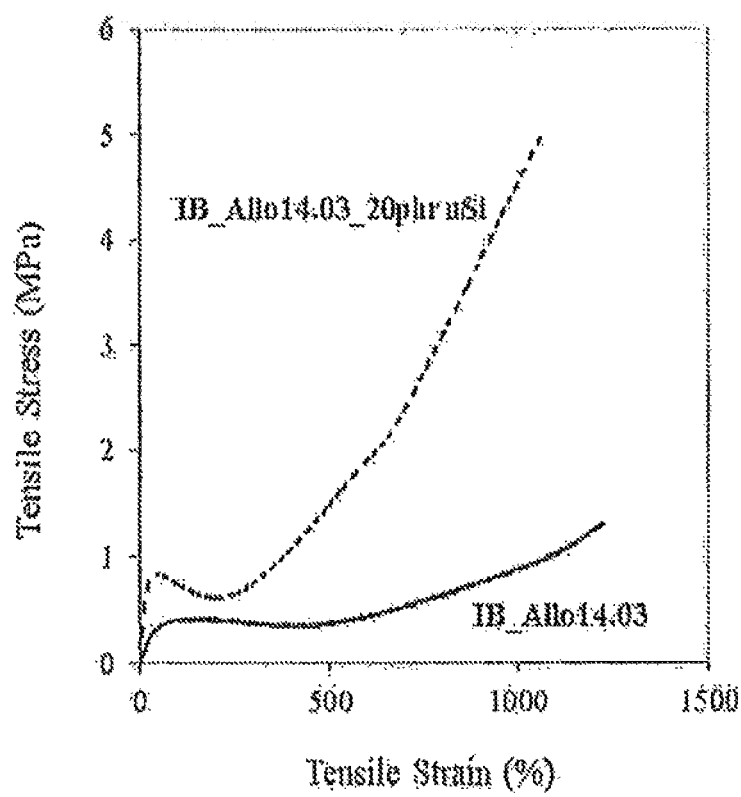
FIG. 36 relates to stress-strain plots of the copolymer of Example 6 and its composite with 20 phr Silica (Evonik Aerosil R812).

FIG. 36 compares the stress-strain plots of the diblock copolymer of Example 6 and its reinforced composite with 20 phr Silica (Evonik Aerosil R812). Surprisingly, the copolymer sample exhibited strain hardening and thermoplastic elastomeric behavior.

EXAMPLE 7

Figure 37:
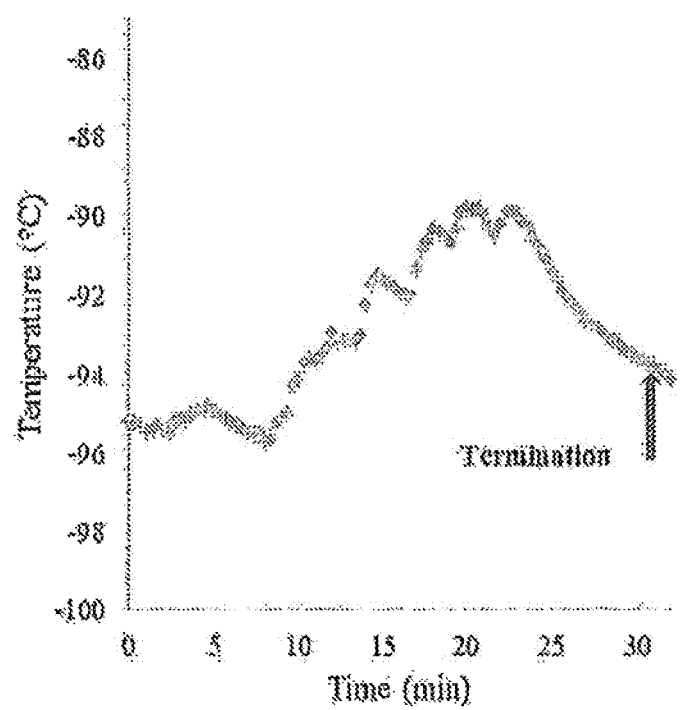
FIG. 37 relates to temperature profile during the polymerization.

2.170 g (0.0163 mol) of $AlCl_3$ was added to 200 mL of MeCl to make a saturated solution. 990 mL (22.0401 mol, 1112.76 g) MeCl and 190 mL (2.4351 mol, 136.61 g) IB were condensed into graduated cylinders cooled in the hexane bath at minus 95° C. 26.5 mL (0.1578 mol, 21.4915 g) Allo was measured into a 30 mL graduated cylinder at room temperature. The reactants were added into a 3000 mL round bottom flask immersed in the cooling bath and stirred with an overhead stirrer at 270 rpm until the internal temperature probe showed minus 95° C. 5 mL catalyst solution was pipetted from the clear top phase and added to the reaction mixture while the temperature was monitored with a thermocouple. A total of 65 mL catalyst solution was added in 5 mL portions. Upon addition of the first increment the color of the mixture turned to yellow and as more catalyst was added the color changed to light red/brown. As the reaction progressed, and more catalyst was added, the color turned to dark red/brown, than light yellow than finally white. The temperature of the reaction mixture also increased as the polymerization progressed, reaching 5.4° C. temperature difference relative to the starting temperature (FIG. 37). After 31 minutes the reaction was terminated with 40 mL NaOH/methanol (0.47 g (0.0118 mol) of NaOH in 100 mL of MeOH). The color of the mixture turned to white, with large polymer chunks stuck onto the stirring shaft and blade and the temperature probe. The reactor was taken out from the dry box and 500 mL of hexane was added. The mixture was kept in a fume hood overnight to let the MeCl to evaporate. A semi-transparent, viscous liquid remained after the evaporation. An additional 1000 mL hexane was added to the mixture and the polymer was precipitated in MeOH: 100 mL polymer solution was added dropwise to 500 mL MeOH with vigorous agitation. The yield was 90.73 g polymer after drying by compression molding, with 61.53% conversion.

Figure 38:
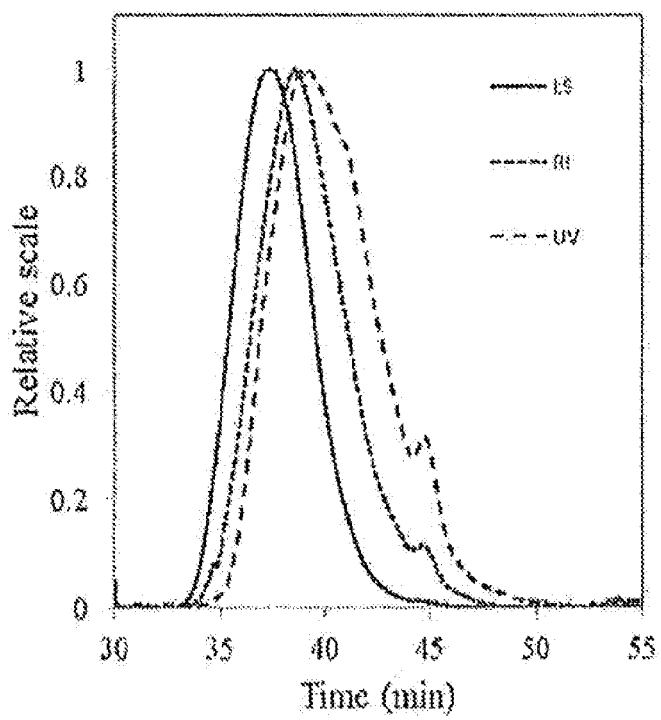
FIG. 38 relates to SEC traces of the copolymer of Example 7.

The SEC traces of the polymer of Example 7 are shown in FIG. 38. The polymer exhibited strong UV absorption at 240 nm across the whole distribution.

SEC analysis yielded $M_w$=451,000 g/mol, $M_n$=224,000 g/mol, $M_w/M_n$=2.02, $M_z$=824,000 g/mol and $R_z$=39.4 nm.

Figure 39:
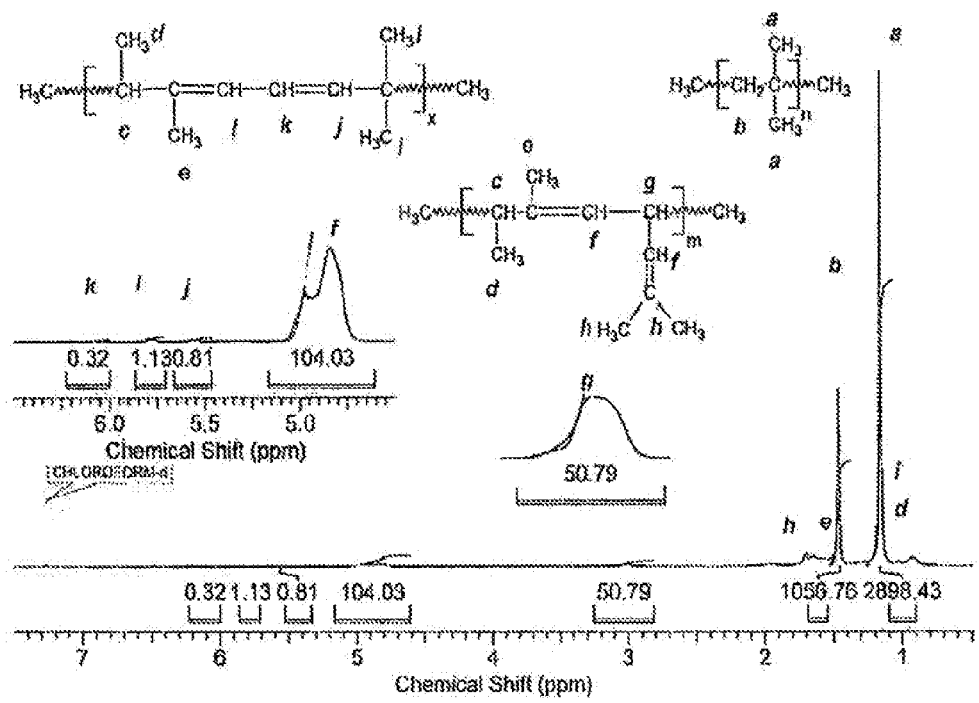
FIG. 39 relates to $^1$H NMR spectrum of the copolymer of Example 7.

FIG. 39 displays the $^1$H NMR spectrum with the proposed structures. The main structure is the 4-7 enchainment (III in Scheme 1). However, the conjugated diene structure corresponds to 2-7 enchainment (IV in Scheme 1), in contrast to structure I found by Marvel. The alloocimene content of the copolymer was calculated using two different approaches. The first approach used the conjugated diene peaks of the 2-7 Allo units at 6.07, 5.77 and 5.55 ppm (k,l,j) and the allylic H signals of the Allo units in 4-7 enchainment (f, 4.75-5.05 ppm), relative to the $CH_3$ proton peaks of the IB units (a, 1.15 ppm). The second approach used the signal at 3 ppm corresponding to proton g in structure III.

Table 7.1 summarizes the results; the two methods agree very well.

TABLE 7.1

Alloocimene content of the copolymer of Example 7.

| Method | Total IB [mol %] | Total Allo [mol %] | Conjugated diene (2-7) [mol %] | Non-conjugated diene (4-7) [mol %] |
|---|---|---|---|---|
| 1. | 90.15 | 9.85 | 0.14 | 9.71 |
| 2. | 90.36 | 9.64 | 0.14 | 9.50 |

Thus the copolymer of Example 7 contains 9.75 mol % (20.97 wt %) polyalloocimene.

Figure 40:
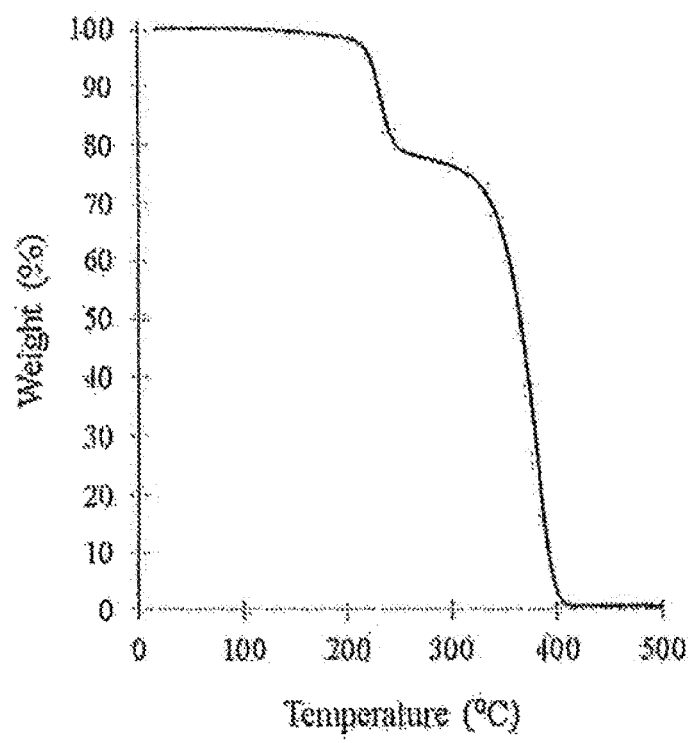
FIG. 40 relates to TGA trace of the copolymer of Example 7.

FIG. 40 displays the TGA traces. Decomposition starts above 200° C. for the polymer. The first step shows ~22 wt % weight loss, which closely corresponds to the 20.97 wt % Allo content. The second step ends at 400° C. with complete decomposition of the polymer.

DSC showed two transitions: at −65.52° C. for PIB, and a weak transition at 77.3° C., most likely representing an alloocimene-rich block.

Figure 41:
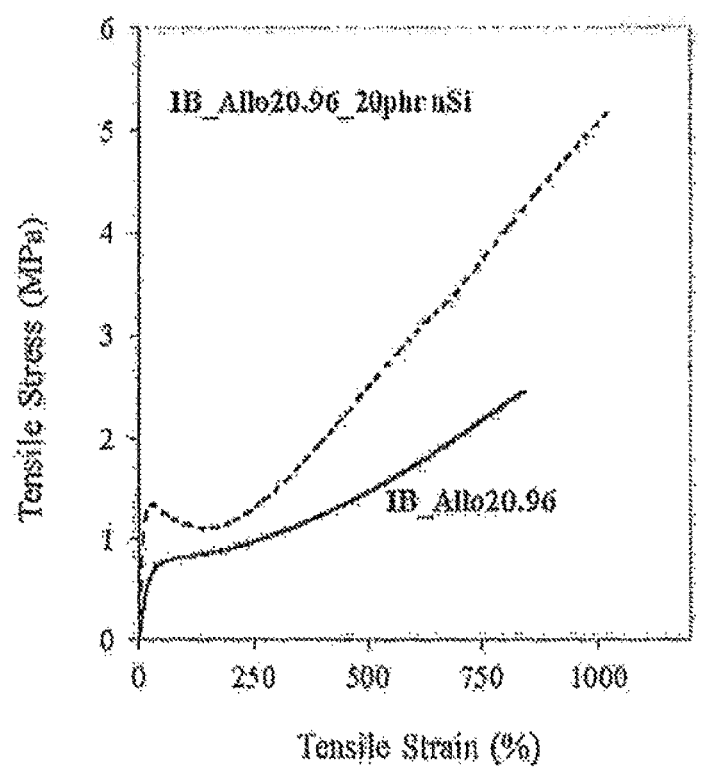
FIG. 41 relates to stress-strain plots of the copolymer of Example 7 and its composite with 20 phr Silica (Evonik Aerosil R812).

FIG. 41 compares the stress-strain plots of the diblock copolymer of Example 7 and its reinforced composite with 20 phr Silica (Evonik Aerosil R812). Surprisingly, the copolymer sample exhibited strain hardening and thermoplastic elastomeric behavior.

EXAMPLE 8

Figure 42:
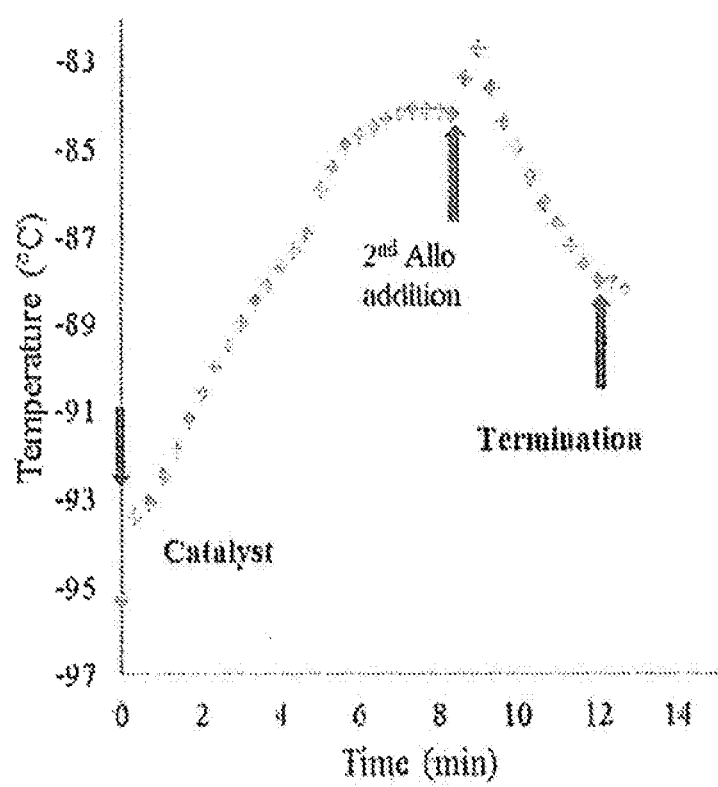
FIG. 42 relates to the temperature profile during the polymerization.

2.05 g (0.0154 mol) of $AlCl_3$ was added to 200 mL of MeCl to make a saturated solution. 720 mL (14.2608 mol, 809.3 g) MeCl and 152 mL (2.7094 mol, 109.3 g) IB were condensed into graduated cylinders cooled in the hexane bath at minus 95° C. 13.6 mL (0.0807 mol, 11 g) Allo was measured into a 25 mL graduated cylinder at room temperature. The reactants were added into a 3000 mL round bottom flask immersed in the cooling bath and stirred with an overhead stirrer at 250 rpm until the internal temperature probe showed minus 95° C. 30 mL catalyst solution from the clear top phase was added to the reaction mixture while the temperature was monitored with a thermocouple. Upon catalyst addition the color of the mixture turned to yellow and during the polymerization it turned red/brown, dark red. Light brown, brown/yellowish and gray/yellowish. At 8:31 minutes reaction time a second aliquot of of 13.6 mL (0.0807 mol, 11 g) Allo was added. Upon the addition of the Alloocimene the color of the reaction mixture turned to orange and over time the color faded away. The temperature of the reaction mixture also increased as the polymerization progressed and it reached 12.6° C. temperature difference relative to the starting temperature (FIG. 42). After 12 minutes the reaction was terminated with 40 mL NaOH/methanol (0.5009 g (0.0125 mol) of NaOH in 100mL of MeOH). The color of the mixture turned to white. The reactor was taken out from the dry box and 500 mL of hexane was added. The mixture was kept in a fume hood overnight to let the MeCl to evaporate. A semi-transparent, viscous liquid remained after the evaporation. An additional 1000 mL hexane was added to the mixture and the polymer was precipitated in MeOH: 100 mL polymer solution was added dropwise to 500 mL MeOH with vigorous agitation. The yield was 88.64 g polymer after drying by compression molding, with 61.08% conversion.

Figure 43:
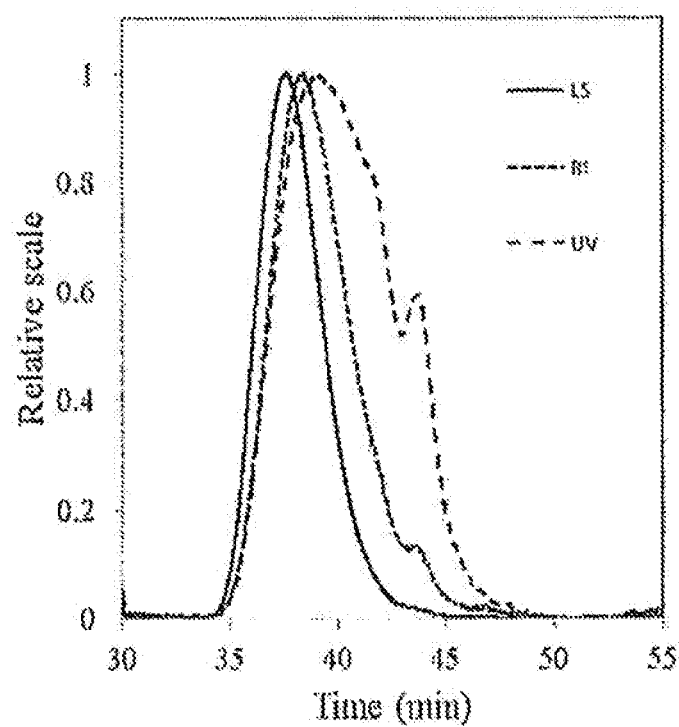
FIG. 43 relates to SEC traces of the copolymer of Example 5.

The SEC traces of the polymer of Example 8 are shown in FIG. 43. The polymer exhibited strong UV absorption at 240 nm across the whole distribution.

SEC analysis yielded $M_w$=365,000 g/mol, $M_n$=217,000 g/mol, $M_w/M_n$=1.75, $M_z$=514,000 g/mol and $R_z$=35.1 nm.

Figure 44:
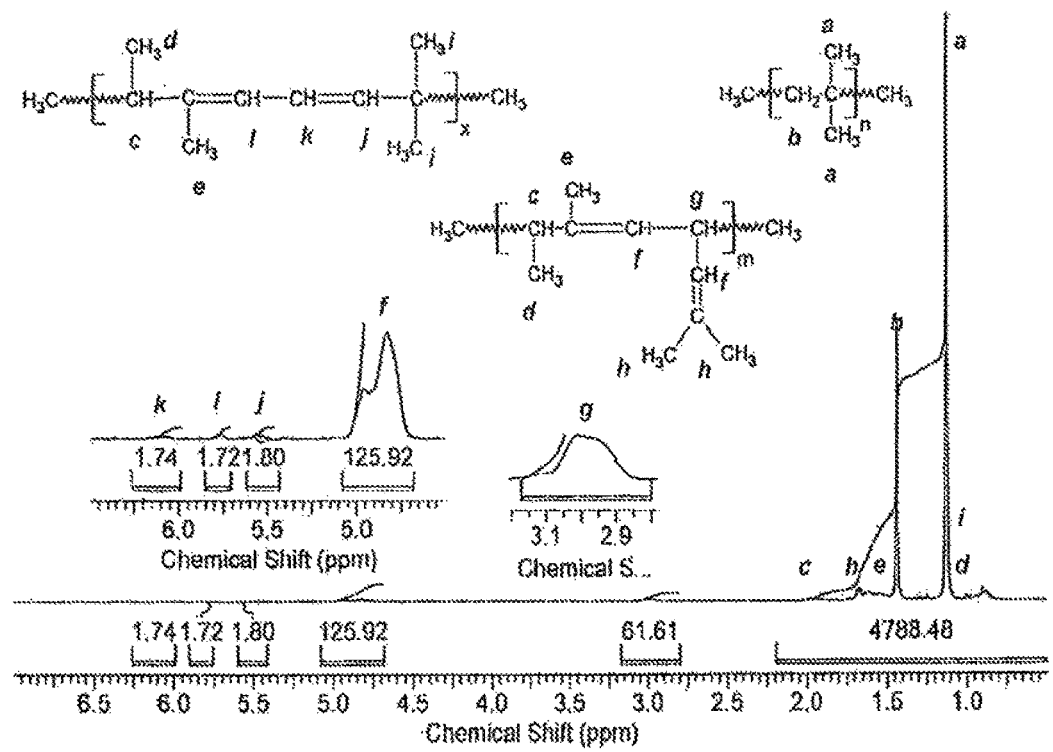
FIG. 44 relates to $^1$H NMR spectrum of the copolymer of Example 8.

FIG. 44 displays the $^1H$ NMR spectrum with the proposed structures. The main structure is the 4-7 enchainment (III in Scheme 1). However, the conjugated diene structure corresponds to 2-7 enchainment (IV in Scheme 1), in contrast to structure I found by Marvel. The alloocimene content of the copolymer was calculated using the conjugated diene peaks of the 2-7 Allo units at 6.07, 5.77 and 5.55 ppm (k,l,j) and the allylic H signals of the Allo units in 4-7 enchainment (f, 4.75-5.05 ppm), relative to the aliphatic peaks from 0.8 to 2.2 ppm.

Table 8.1 summarizes the results; the two methods agree very well.

TABLE 8.1

Alloocimene content of the copolymer of Example 8.

| Method | Total IB [mol %] | IB [wt %] | Total Allo [mol %] | Allo [wt %] | Conjugated diene (2-7) [mol %] | Non-conjugated diene (4-7) [mol %] |
|---|---|---|---|---|---|---|
| 1. | 88.24 | 75.55 | 11.76 | 24.45 | 0.32 | 11.44 |

Figure 45:
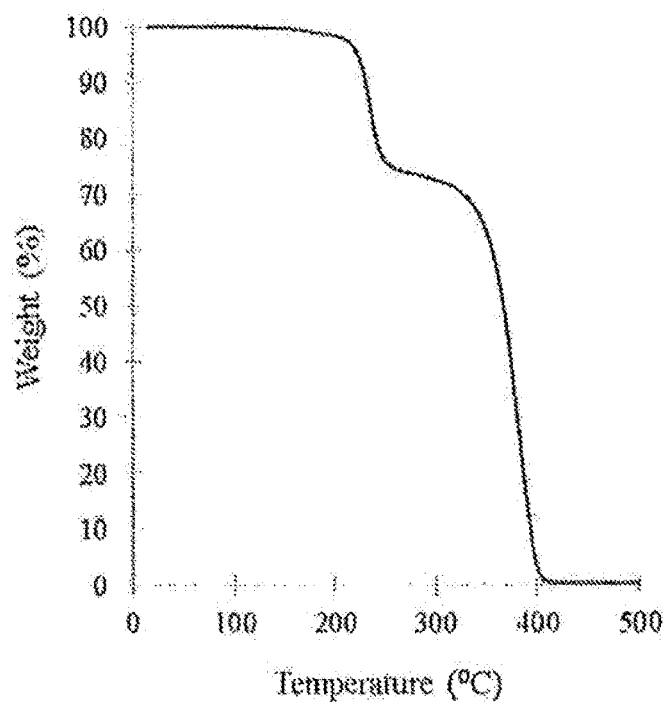
FIG. 45 relates to TGA trace of the copolymer of Example 8.

FIG. 45 displays the TGA traces. Decomposition starts above 200° C. for the polymer. The first step shows ~25 wt % weight loss, which closely corresponds to the 24.45 wt % Allo content. The second step ends at 400° C. with complete decomposition of the polymer.

Figure 46:
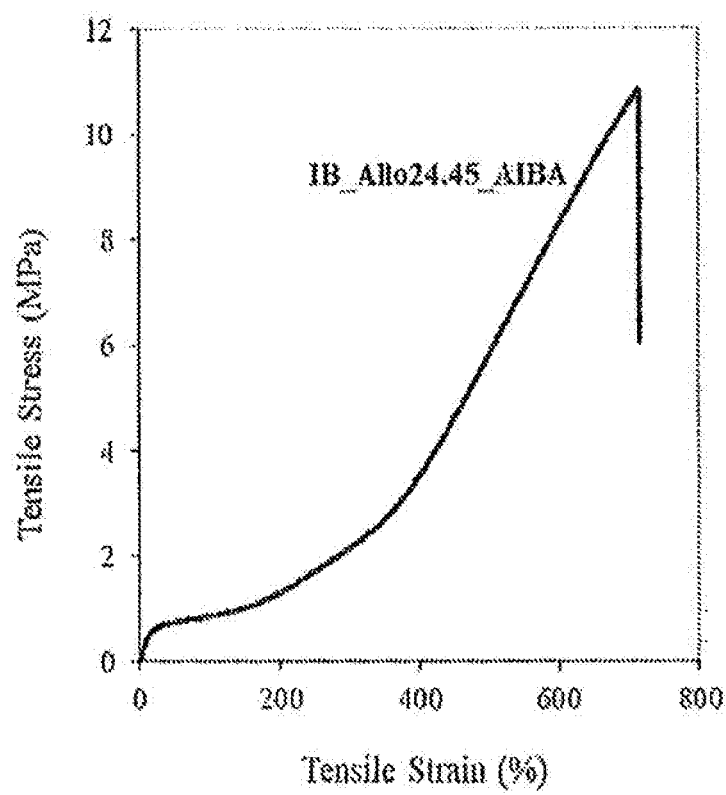
FIG. 46 relates to stress-strain plots of the copolymer of Example 8.

FIG. 46 compares the stress-strain plots of the copolymer of Example 8. Surprisingly, the triblock copolymer sample exhibited strain hardening and thermoplastic elastomeric behavior.

EXAMPLE 9

Figure 47:
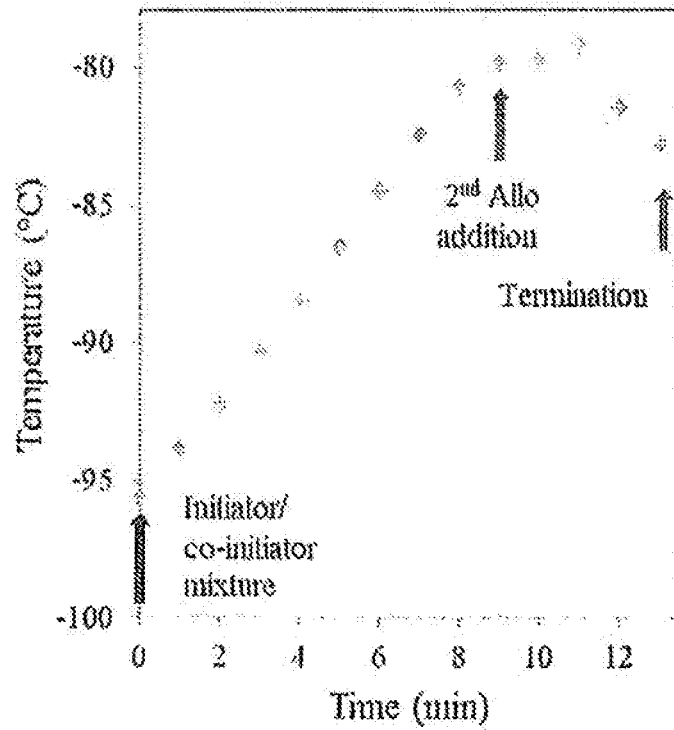
FIG. 47 relates to temperature profile during the polymerization.

1.56 g (0.117 mol) of $AlCl_3$ was added to 150 mL of MeCl to make a saturated solution. 900 mL (20.0364 mol, 1011.6 g) MeCl and 190 mL (2.4351 mol, 136.61 g) IB were condensed into graduated cylinders cooled in the hexane bath at minus 95° C. 17.2 mL (0.1023 mol, 13.949 g) Allo was measured into a 25 mL graduated cylinder at room temperature. The reactants were added into a 3000 mL round bottom flask immersed in the cooling bath and stirred with an overhead stirrer at 250 rpm until the internal temperature probe showed minus 95° C. 31 mL catalyst solution from the clear top phase was added to the reaction mixture while the temperature was monitored with a thermocouple. Upon catalyst addition the color of the mixture turned to yellow and during the polymerization it turned red/brown, dark red. Light brown, brown/yellowish and gray/yellowish. At 9:45 minutes reaction time a second aliquot of 17 mL (0.0.1012 mol, 13.787 g) Allo was added. Upon the addition of the Alloocimene the color of the reaction mixture turned to orange and over time the color faded away. The temperature of the reaction mixture also increased as the polymerization progressed and it reached 17° C. temperature difference relative to the starting temperature (FIG. 47). After 13:15 minutes the reaction was terminated with 40 mL NaOH/methanol (0.5009 g (0.0125 mol) of NaOH in 100 mL of MeOH). The color of the mixture turned to white. The reactor was taken out from the dry box and 500 mL of hexane was added. The mixture was kept in a fume hood overnight to let the MeCl to evaporate. A semi-transparent, viscous liquid remained after the evaporation. An additional 1000 mL hexane was added to the mixture and the polymer was precipitated in MeOH: 100 mL polymer solution was added dropwise to 500 mL MeOH with vigorous agitation. The yield was 120 g polymer after drying by compression molding, with 73.02%.conversion.

Figure 48:
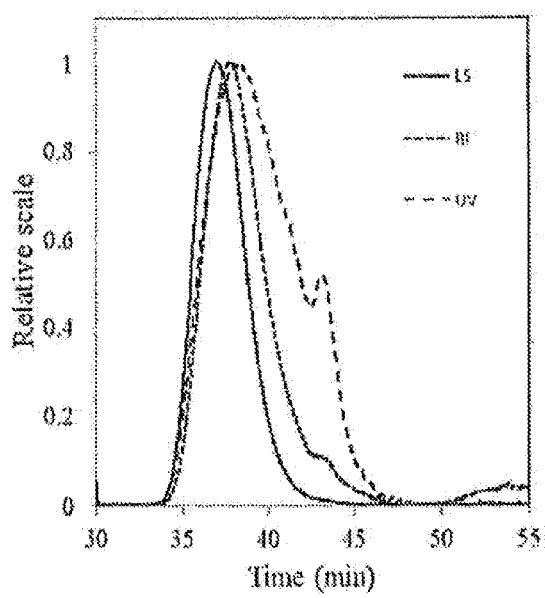
FIG. 48 relates to SEC traces of the copolymer of Example 9.

The SEC traces of the polymer of Example 9 are shown in FIG. 48. The polymer exhibited strong UV absorption at 240 nm across the whole distribution.

SEC analysis yielded $M_w$=499,000 g/mol, $M_n$=264,000 g/mol, $M_w/M_n$=1.89, $M_z$=702,000 g/mol and $R_z$=38 nm.

Figure 49:
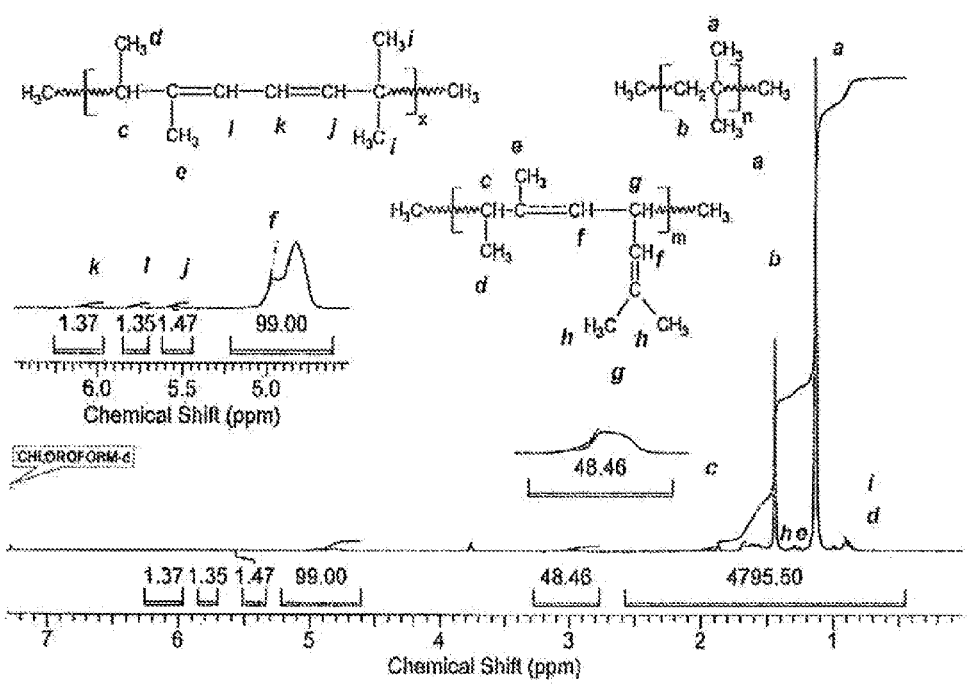
FIG. 49 relates to $^1$H NMR spectrum of the copolymer of Example 9.

FIG. 49 displays the $^1H$ NMR spectrum with the proposed structures. The main structure is the 4-7 enchainment (III in Scheme 1). However, the conjugated diene structure corresponds to 2-7 enchainment (IV in Scheme 1), in contrast to structure I found by Marvel. The alloocimene content of the copolymer was calculated using the conjugated diene peaks of the 2-7 Allo units at 6.07, 5.77 and 5.55 ppm (k,l,j) and the allylic H signals of the Allo units in 4-7 enchainment (f, 4.75-5.05 ppm), relative to the aliphatic peaks from 0.8 to 2.2 ppm.

Table 9.1 summarizes the results.

TABLE 9.1

Alloocimene content of the copolymer of Example 9.

| Method | Total IB [mol %] | IB [wt %] | Total Allo [mol %] | Allo [wt %] | Conjugated diene (2-7) [mol %] | Non-conjugated diene (4-7) [mol %] |
|---|---|---|---|---|---|---|
| 1. | 90.93 | 80.51 | 9.07 | 19.49 | 0.25 | 8.82 |

Figure 50:
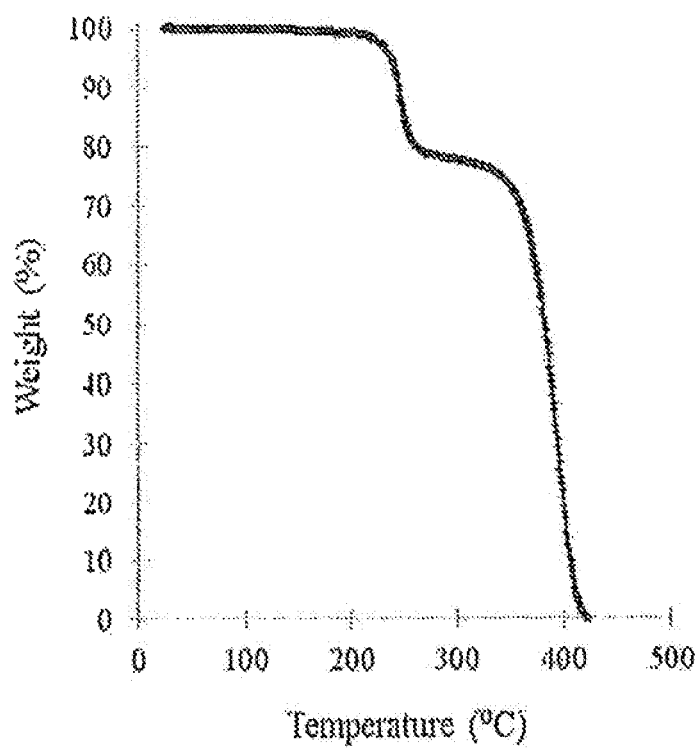
FIG. 50 relates to TGA trace of the copolymer of Example 9.

FIG. 50 displays the TGA traces. Decomposition starts above 200° C. for the polymer. The first step shows ~20 wt % weight loss, which closely corresponds to the 19.49 wt % Allo content. The second step ends at 425° C. with complete decomposition of the polymer.

Figure 51:
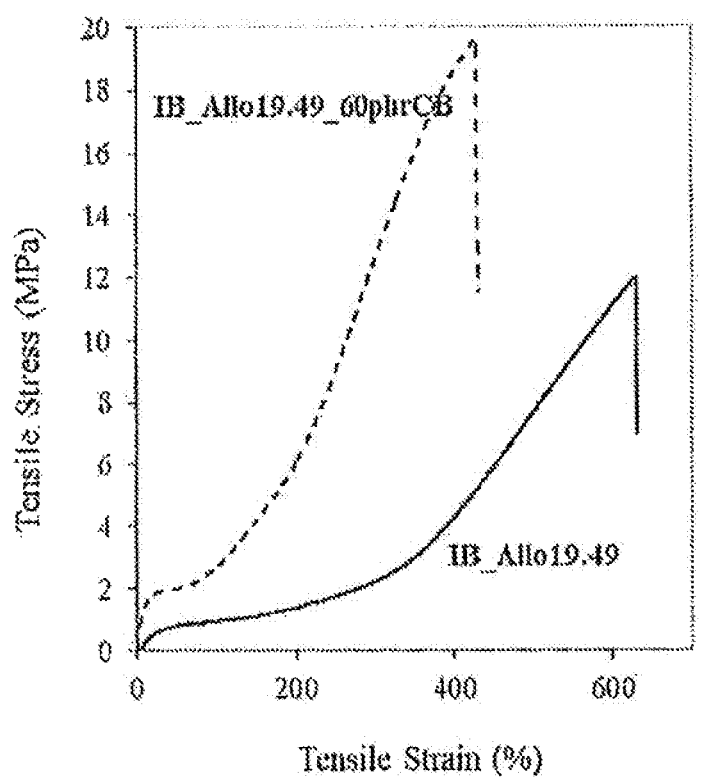
FIG. 51 relates to stress-strain plots of the copolymer of Example 9.

FIG. 51 compares the stress-strain plots of the copolymer of Example 9. Surprisingly, the triblock copolymer sample exhibited strain hardening and thermoplastic elastomeric behavior. The polymer were compounded with 60 phr Carbon Black and the resulting triblock copolymer and carbon black composite showed improved mechanical properties and exhibited thermoplastic elastomeric behavior.

EXAMPLE 10

Figure 52:
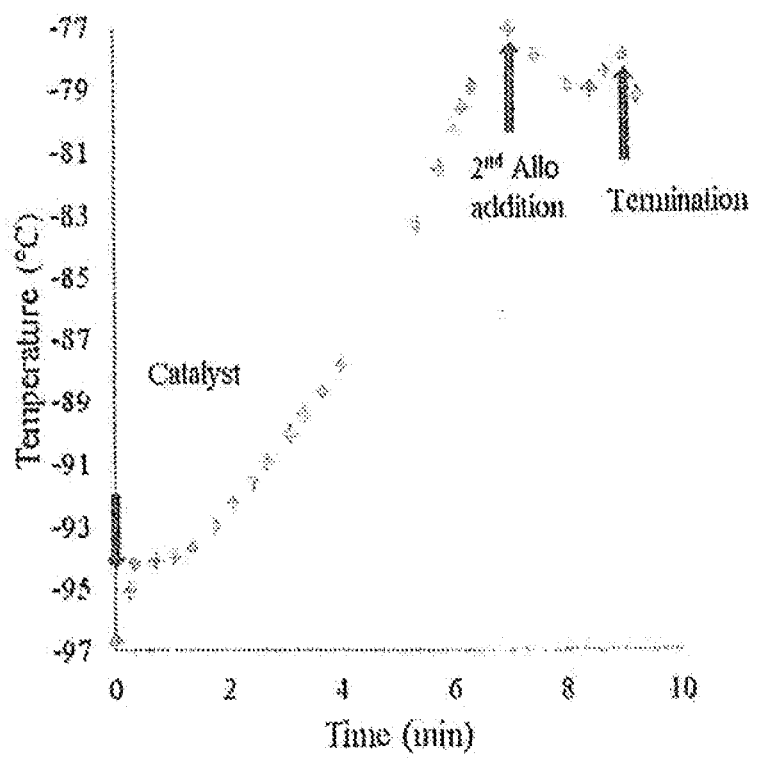
FIG. 52 relates to temperature profile during the polymerization.

1.56 g (0.117 mol) of $AlCl_3$ was added to 150 mL of MeCl to make a saturated solution. 900 mL (20.0364 mol, 1011.6 g) MeCl and 190 mL (2.4351 mol, 136.61 g) IB were condensed into graduated cylinders cooled in the hexane bath at minus 95° C. 17.4 mL (0.1036 mol, 14.1114 g) Allo was measured into a 25 mL graduated cylinder at room temperature. The reactants were added into a 3000 mL round bottom flask immersed in the cooling bath and stirred with an overhead stirrer at 250 rpm until the internal temperature probe showed minus 95° C. 30 mL catalyst solution from the clear top phase was added to the reaction mixture while the temperature was monitored with a thermocouple. Upon catalyst addition the color of the mixture turned to yellow and during the polymerization it turned red/brown, dark red. Light brown, brown/yellowish and gray/yellowish. At 6:25 minutes reaction time a second aliquot of 17.4 mL (0.1036 mol, 14.1114 g) Allo was added. Upon the addition of the Alloocimene the color of the reaction mixture turned to orange and over time the color faded away. The temperature of the reaction mixture also increased as the polymerization progressed and it reached 17.7° C. temperature difference relative to the starting temperature (FIG. 52). After 9:25 minutes the reaction was terminated with 40 mL NaOH/methanol (0.5009 g (0.0125 mol) of NaOH in 100 mL of MeOH). The color of the mixture turned to white. The reactor was taken out from the dry box and 500 mL of hexane was added. The mixture was kept in a fume hood overnight to let the MeCl to evaporate. A semi-transparent, viscous liquid remained after the evaporation. An additional 1000 mL hexane was added to the mixture and the polymer was precipitated in MeOH: 100 mL polymer solution was added dropwise to 500 mL MeOH with vigorous agitation. The yield was 101.61 g polymer after drying by compression molding, with 61.64% conversion.

Figure 53:
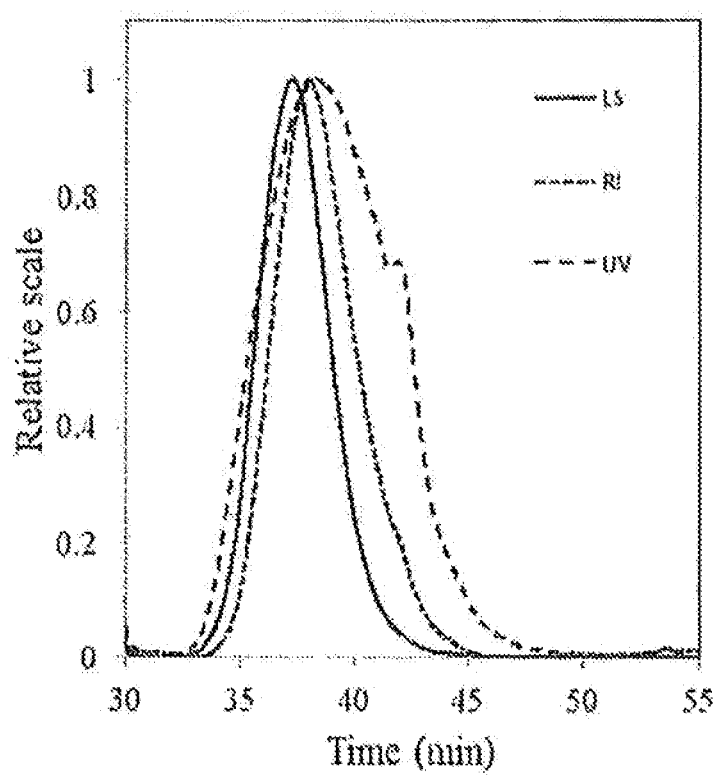
FIG. 53 relates to SEC traces of the copolymer of Example 10.

The SEC traces of the polymer of Example 10 are shown in FIG. 53. The polymer exhibited strong UV absorption at 240 nm across the whole distribution.

SEC analysis yielded $M_w$=558,000 g/mol, $M_n$=358,000 g/mol, $M_w/M_n$=1.56, $M_z$=852,000 g/mol and $R_z$=38.4 nm.

Figure 54:
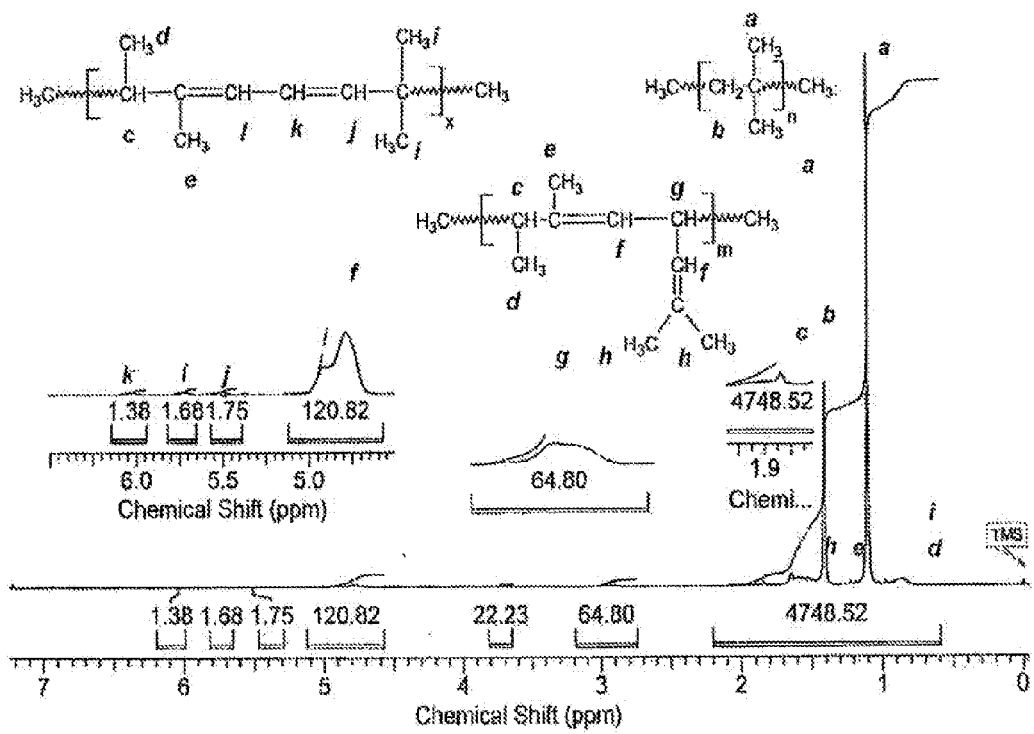
FIG. 54 relates to $^1$H NMR spectrum of the copolymer of Example 10.

FIG. 54 displays the $^1$H NMR spectrum with the proposed structures. The main structure is the 4-7 enchainment (III in Scheme 1). However, the conjugated diene structure corresponds to 2-7 enchainment (IV in Scheme 1), in contrast to structure I found by Marvel. The alloocimene content of the copolymer was calculated using the conjugated diene peaks of the 2-7 Allo units at 6.07, 5.77 and 5.55 ppm (k,l,j) and the allylic H signals of the Allo units in 4-7 enchainment (f, 4.75-5.05 ppm), relative to the aliphatic peaks from 0.8 to 2.2 ppm.

Table 10.1 summarizes the results.

TABLE 10.1

Alloocimene content of the copolymer of Example 10.

| Method | Total IB [mol %] | IB [wt %] | Total Allo [mol %] | Allo [wt %] | Conjugated diene (2-7) [mol %] | Non-conjugated diene (4-7) [mol %] |
|---|---|---|---|---|---|---|
| 1. | 88.67 | 76.32 | 11.33 | 23.68 | 0.29 | 11.04 |

Figure 55:
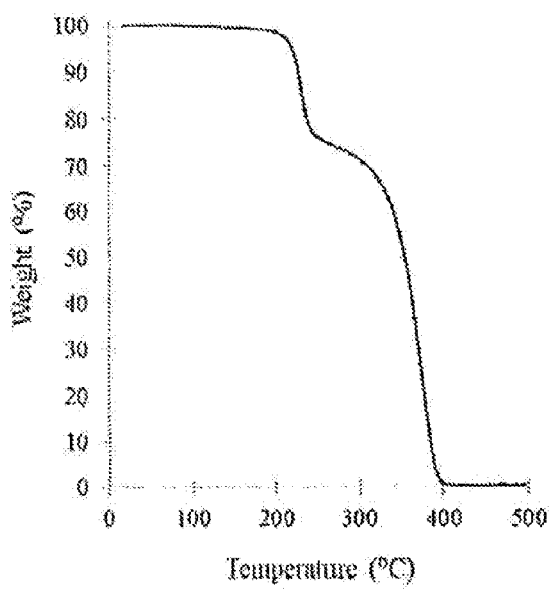
FIG. 55 relates to TGA trace of the copolymer of Example 10.

FIG. 55 displays the TGA traces. Decomposition starts above 200° C. for the polymer. The first step shows ~25 wt % weight loss, which closely corresponds to the 23.68 wt % Allo content. The second step ends at 425° C. with complete decomposition of the polymer.

FIG. 56 compares the stress-strain plots of the copolymer of Example 10. Surprisingly, the triblock copolymer sample exhibited strain hardening and thermoplastic elastomeric behavior. The polymer were compounded with 15, 30, 45 and 60 phr Carbon Black and the resulting triblock copolymer and carbon black composites showed improved mechanical properties and exhibited thermoplastic elastomeric behavior.

FIG. 56 shows the positive effect of the carbon black on the mechanical properties of the triblock copolymer, more particularly the increase of tensile strength (at beak) and modulus upon the increase of the amount of carbon black. However in the case of 60 phr carbon black the tensile strength (at break) decreases compared to the case when 45 phr carbon black was used.

EXAMPLE 11

Technical grade (80%) alloocimene (2,6-dimethyl-2,4,6-octatriene) was purchased from Aldrich and purified by column chromatography and cryodistillation. IB and MeCl were obtained courtesy of Exxon Mobil, and were condensed from the gas phase after passing them through columns packed with $BaO/CaCl_2$. Anhydrous aluminum chloride ($AlCl_3$) was purchased from Sigma-Aldrich (99.99%). Hexane(s) (Mallinckrodt Chemicals), methanol (MeOH, Sigma Aldrich) and sodium hydroxide (NaOH, J.T. Baker) were used as received.

The copolymerization experiments were carried out under a dry nitrogen atmosphere in an MBraun 200B dry box ($H_2O$<1 ppm, $O_2$<10 ppm). Two grams (0.015 mol) of $AlCl_3$ were added to 200 ml of MeCl to make a saturated solution (0.9 wt %). At minus 95° C., 890 mL MeCl and 190 ml (2.44 mol) IB were condensed into the 3000-mL reaction vessel. About 17.2 mL (0.102 mol) Allo, measured at room temperature, was added to the mixture, which was stirred with an overhead mixer at 250 rpm. About 30 mL saturated $AlCl_3$ solution in MeCl was added to the reaction mixture while the temperature of the reaction mixture was monitored with a thermocouple. The color of the mixture first turned to yellow and subsequently a milk-like white emulsion was formed. The temperature of the reaction mixture increased from minus 95° C. to minus 82° C. After 34 minutes the reaction was terminated with 40 mL 0.12 M NaOH/MeOH solution. The reactor was taken out from the dry box and 500 mL of hexane(s) were added. The mixture was kept in a fume hood overnight to let the MeCl evaporate. A semi-transparent, viscous liquid remained after the evaporation. An additional 1000 mL hexane(s) were added to the mixture and the polymer was precipitated in MeOH and dried until constant weight. The yield was 127.2 g polymer with 90% conversion.

Characterization of the size exclusion chromatography is carried out as set forth above herein as was the utilization of a differential scanning calorimetry. Nuclear magnetic resonance (NMR, 500 MHz) spectra were collected at room temperature with a Varian NMRS 500 spectrometer in $CDCl_3$ (~100 mg/mL) with 1024 scans, 10 sec relaxation time and 45° pulse angel with tetramethyl silane (TMS, $\delta$=0 ppm) as an internal reference.

About 5-10 mg of polymer was used to carry out thermogravimetric analysis (TGA) measurement on a TA Instruments Q500 with 10° C/min heating rate under nitrogen.

Tensile testing was carried out on an Instron 5567 equipment with a 1000-N load cell using micro-dumbbell specimens (length=45 mm, neck width=3 mm, and thickness=1 mm) and a cross-head speed of 500 mm/min according to ASTM D 412-06 a. The micro-dumbbells were cut from compression molded sheets (preheating at 100° C. for 8 minutes at 3000 pounds per square inch (PSI), molding at 100° C. for 2 minutes at 12,500 PSI and cooling for 10 minutes at 12,500 PSI).

A Philips Tecnai 12 electron microscope was used with an accelerating voltage of 120 kV. The polymers dissolved in THF (0.5 wt % solution) were deposited onto carbon coated copper mesh grids (mesh size 400, no. 3540 C, lot no. 1130912, SPI). The films were dried under vacuum for 12 hours and stained with $OsO_4$ for 1 hour.

Atomic force microscopy (AFM) images were collected on a Dimension 3000 instrument with Nanoscope III controller, operating in tapping mode. Silicon cantilevers (type ACLA from Applied Nano Devices) were used, with medium-light tapping conditions (2.0 V free amplitude, and an amplitude set point of 1.6 V). The sample was cryofaced at minus 120° C. using a diamond knife.

After the addition of saturated $AlCl_3$ solution in MeCl (0.9 wt %) to the reaction mixture of IB and Allo in MeCl cooled to minus 95° C., the temperature started to rise and reached minus 82° C. in 11 minutes. This is in sharp contrast to the extremely fast nature of the copolymerization of IB with IP (47 seconds) carried out under the same conditions.[3] In addition, a milk-like emulsion formed showing no sign of aggregation during the entire course of the reaction. This permitted sampling of the stable emulsion of low viscosity during the reaction. The $M_n$-conversion plot [FIG. 57(a)] is linear up to ~40% conversion ($M_n$=250,000 g/mol) when it starts to deviate from the line. The polymer concentration calculated as gram polymer/L/$M_n$ remained constant at $[P]=2.2\times10^{-4}$ mol/L during this period.

The $\ln([M]_0/[M])$ vs. time plot [FIG. 57(b)] is also linear up to 400 seconds. The reaction was terminated after 34 minutes. The final product had $M_n$=234,000 g/mol and $M_w$=598,000 g/mol at 90% conversion. The polymer concentration increased to $[P]=5.4\times10^{-4}$ mol/L, indicating chain transfer and/or slow initiation.

Figure 58:
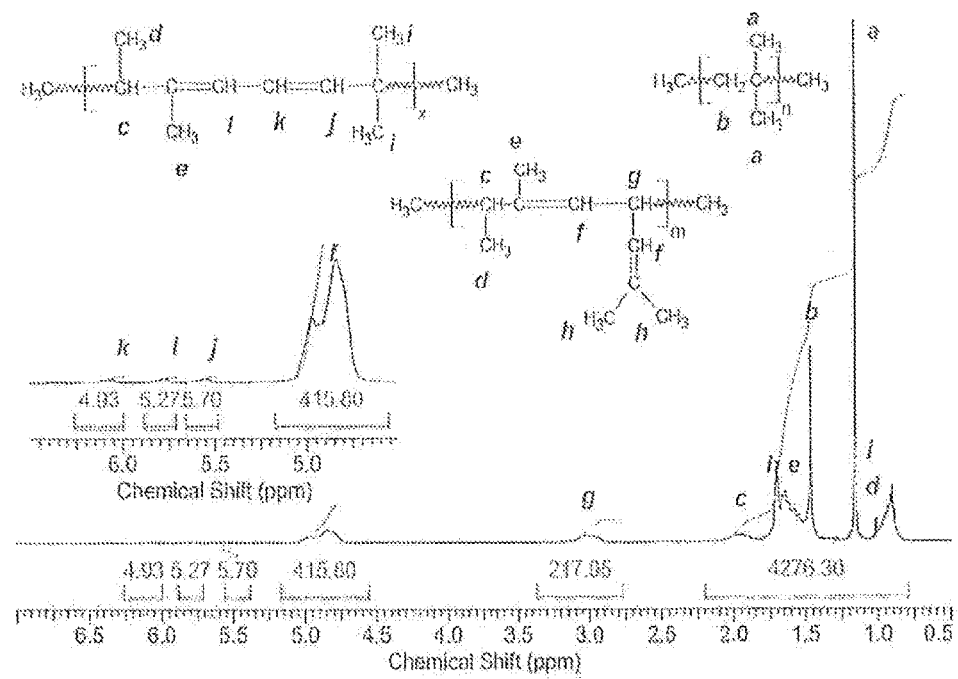
FIG. 58 relates to $^1$H NMR of the aliquot at 81 seconds.

FIG. 58 displays the $^1$H NMR spectrum with the proposed structures. The main structure was found to the the 4-7 enchainment (III in Scheme 1). However, the conjugated diene structure was identified to be in the 2-7 enchainment (IV in Scheme 1). The Allo content of the copolymer was calculated using two different approaches. The first approach used the ratio of the conjugated diene proton signals of the 2-7 Allo units at 6.07, 5.77, and 5.55 ppm (k, l, j) plus the H signal of the Allo units in 4-7 enchainment (f, 4.75-5.05 ppm), and the $CH_3$ proton peaks of the IB units (a, 1.15 ppm). The second approach used the g allylic proton signal at 3 ppm instead of proton f. The first sample had 76.16 wt % Allo with 1.9 wt % conjugated diene content, while the final product had 8.9 wt % Allo with 0.2 wt % conjugated diene content. This suggests that Allo polymerizes much faster than IB, incorporating in a blocky manner. However, since the polymer concentration increased 2.5-fold after the living phase, and both slow initiation and chain transfer would product PIB homopolymer, the product is likely a mixture of diblocks composed of Allo-rich and PIB-rich phases and PIB homopolymer.

Figure 59:
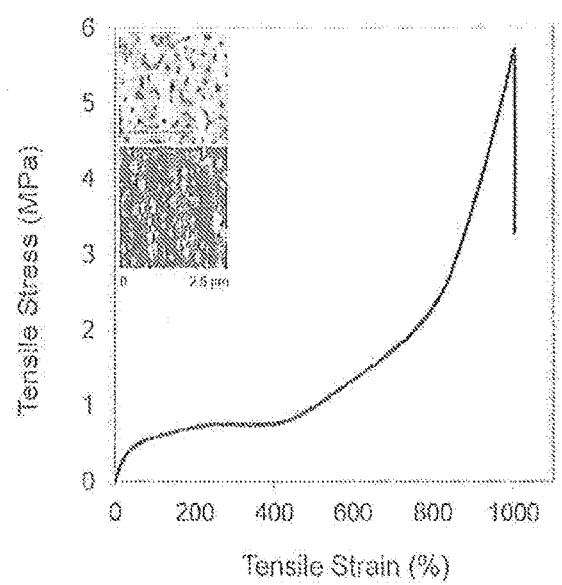
FIG. 59 relates to stress-strain plot of a PIB-PAllo diblock ($M_n$=234,000 g/mol, $M_w$=598,000 g/mol, $M_w/M_n$=2.56); Insets: TEM (top) and AFM (bottom).

TGA showed a stepwise mass decrease of approximately 10% in the 200-270° C. range, followed by complete decomposition in the 300-400° C. range. This also supports the presence of blocky structures having an Allo-rich block and a PIB-rich block. The final product of another experiment with $M_n$=302,000 g/mol; $M_w$=589,000 g/mol, $M_w/M_n$=1.95 and 11 wt % Allo content was subjected to TGA. After the initial stepwise mass loss the measurement was stopped and the degraded sample was analyzed by SEC. The $M_n$ decreased to 105,000 g/mol, and the $M_w/M_n$ increased to 3.27, indicating that some Allo units were randomly distributed in the PIB-rich phase. DSC revealed two transitions; one for the PIB-rich block at minus 66° C., and one for the Allo-rich block at 71° C. Transmission electron microscopy (TEM) and AFM verified the phase-separated structure of the polymer (FIG. 59). The dark phases represent the Allo-rich blocks. The phases are irregular; ranging from about 50 nm to 500 nm. This is most likely due to the broad MWD and/or the presence of PIB homopolymer. Macroscopically the polymer is transparent.

FIG. 59 also displays the stress-strain plot. Surprisingly, the polymer exhibited thermoplastic elastomeric (TPE) properties with 6 MPa ultimate tensile strength and 1000% strain at break. FIG. 49 also shows strain hardening—strain induced crystallization of PIB-based polymers is well-known.[4,5] The polymerization experiment was repeated six times, all yielding products with $M_n$>200,000 g/mol and tensile strengths ranging from 2 to 6 MPa. In contrast, a butyl rubber sample (Exxon™ butyl rubber 268) with $M_n$=250,000 g/mol showed a maximum tensile stress of 0.47, with no strain hardening.

This is the first report of a polymer containing diblock structure exhibiting TPE properties. It is now accepted that only triblocks exhibit TPE properties and diblock and homopolymer contamination reduces the tensile strength of triblocks.[6] Our explanation of phenomenon we discovered is that the high molecular weight IB-rich block is well-entangled, anchoring that block at one end of the chain while the phase separated Allo rich blocks constitute physical "crosslinks" at the other end of the chain. The high molecular weight PIB homopolymer is well-entangeled with the PIB-rich phases of the diblock, resulting in reinforcement by strain-induced crystallization and TPE behavior.

This is also the first living IB polymerization solving the most important problems related to the currently used TiCl$_4$-based systems: expensive initiators, expensive co-initiator at high concentration, and high polymer solution viscosity at low concentration (15 wt %). Our new living polymerization offers a cheap intiating system (AlCl$_3$/H$_2$O), low viscosity (stable emulsion) leading to improved heat transfer.[7] It is most likely that the Allo-rich polymer forming at the beginning of the polymerization acts as an emulsifier/stabilizer. McHale et al. reported the controlled nitroxide-mediated two-phase polymerization of styrene using block copolymer stabilizers, but reached only relatively low molecular weights.[8] The concept of using "inistab" (colloidal initiator-stabilizer) for controlled two-phase radical polymerizations have been extended to other monomers as well,[9] opening the door to successful commercialization of living/controlled polymerizations.

To further test the livingness of the system we carried out experiments, where another Allo-containing aliquot was added to the reaction before the deviation from the theoretical $M_n$-conversion plot. This should yield a triblock copolymer (Allo-rich-b-PIB-b-Allo-rich) with improved mechanical properties. Indeed, polymers prepared this way had 19.5 and 25 wt % Allo content with $M_n$=264,000 and 220,000 g/mol and $M_w/M_n$=1.9 and 1.7, and exhibited 12.1 and 11 MPa tensile strength with 640 and 600% elongation.

In summary, the copolymerization of IB with Allo using the AlCl$_3$/H$_2$O initiating system in MeCl at minus 95° C. resulted in a stable emulsion and displayed controlled/living character up to 40% conversion. This is the first controlled/living carbocationic polymerization in a two-phase system. The polymers produced were a mixture of PIB homopolymer and a diblock-like structure with an Allo-rich and an IB-rich segment, and displayed TPE properties. This is the first example of a TPE containing only diblocks. Most likely the high molecular weight IB-rich block is well-entangled with the PIB homopolymer, anchoring that block and allowing reinforcement by strain-induced crystallization. The new living system also produced (Allo-rich-b-PIB-b-Allo-rich) triblocks that displayed excellent mechanical properites.

4. Gonzalez-Alvarez, A.; Arellano, M.; Diat, O.; Legrand, J. F.; Piau, J. M. *Rev Mex. Fis.* 2004, 50, 506-514.
5. Kaszas, G. *Poly. Mater. Sci. Eng.* 1993, 68, 325-326.
6. Holden, G.; Kricheldorf, H. R.; Quirk, R. P.eds.; Thermoplastic Elastomers, 3$^{rd}$ ed., Hanser: Munich, 2004.
7. Puskas, J. E.; Kaszas, G.; Gergely, A. L. Provisional U.S. Patent Application # 61/587,736, Jan. 18, 2012.
8. McHale, R.; Aldabbagh, F.; Zetterlund, P. B.; Okubo, M. *Macromol. Chem. Phys.* 2007, 208, 1813-1822.
9. Zetterlund, P. B.; Aldabbagh, F.; Okubo, M. *J. Polym. Sci. Part A: Polym. Chem.* 2009, 47, 3711-3728.

APPLICATION

The copolymers of this invention can be used in many applications. For example the isobutylene/terpene/isoprene copolymer can be used in applications where butyl elastomer is used. After halogenation of the isobutylene/terpene/isoprene copolymer it can be used in application where chlorobutyl, bromobutyl, or brominated isobutylene/p-methyl styrene copolymer is used. The advantage of the copolymer of the present invention over butyl or halobutyl elastomers is that it can be easily functionalized in solution or in a mixer in dry from using a dienophile or a dienophile to which a functional group is attached to further improve the filler interaction of the polymer with conventional fillers such as silica or carbon black or nonconventional ones such as starch, cellulose, fullerene derivatives and nanoclay. For example, the functionalized copolymers of this invention can be used to exfoliate nanoclays in order to reduce the air permeability of the elastomer below that of the conventional butyl or halobutyl elastomers, and thus can be used as an air or gas sealing layer as in tubeless tires, tubes such as inner tubes, and the like, or as a rubber article per se such as an inner tube, a tire, or other rubber article.

Other applications of the copolymers of this invention are the applications where low, medium or high molecular weight polyisobutylene is currently used. Examples are double-glazing sealants, cable sheathing and protective coatings for pipelines, engine coolants, brake fluids and other specialized fluids, mineral oil dyes and markers, refinery chemicals and diesel and gasoline additives in the automotive and oil industry. The reaction product of the copolymer of this invention with dienophile or dienophiles to which a properly selected functional group is attached can be used to improve the performance of all types of engine fuels and lubricants. In the biomedical field the copolymer of this invention can be used in application such as wound care, ostomy bags, medical plaster, drug delivery patch systems and medical stoppers. Other medical application is the use of the copolymer of present invention as coating or drug eluting coating of implanted medical devices, wires and other metal objects.

The copolymers of the invention displaying thermoplastic elastomeric properties in the unfilled or filled form can be used in a wide variety of applications, similarly to the application of other thermoplastic elastomers, especially those containing polyisobutylene blocks and blocks of polystyrene or its derivatives, or their copolymers. That is, they are readily processed on conventional plastic equipment such as injection molders, below molders, extruders, and the like, but develop their final rubber-like properties upon cooling. Accordingly, they are not vulcanized.

What is claimed is:

1. A thermoplastic elastomer (TPE), comprising a linear triblock or linear multiblock copolymer or any combination thereof, having repeat units derived from at least one isoolefin monomer having from 4 to about 7 carbon atoms, and having repeat units derived from at least one terpene monomer having the formula (C$_5$H$_8$)n, wherein n is 2 or more; and optionally repeat units derived from one or more dienes, styrene or a derivative thereof, indene or a derivative thereof, or any combination thereof, wherein said terpene is selected from the group consisting of alloocimene, neo-alloocimene, and any combination thereof.

2. The TPE of claim 1, wherein the weight average molecular weight of said block copolymer is at least about 1,000 to about 5,000,000 g/mol.

3. The TPE of claim 2, wherein said weight average molecular weight is from about 200,000 to about 1,000,000 g/mol, wherein said isoolefin is 2-methyl propene (isobutylene), 2-methyl-1-butene, 3-methyl-1-butene, 2-methyl-2-butene, 4-methyl-1-pentene and any combination thereof.

4. The TPE of claim 3, wherein said weight average molecular weight is from about 300,000 to about 800,000 g/mol.

5. The TPE of claim 3, further comprising a filler.

6. The TPE of claim 1, wherein said TPE has a UV adsorption at about 240 nanometers and said UV adsorption is at least twice as intense as that of the polymer made in the absence of said terpene.

7. The TPE of claim 1, wherein said optional repeat units are present and are selected from the group consisting of 2-methyl-butadiene-1,3 (isoprene), butadiene, 2-methylbutadiene, 2,4-dimethylbutadiene, piperyline, β-pinene, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 2-methyl-1,6-heptadiene, cyclopenta-diene, methylcyclopentadiene, cyclohexadiene, 1-vinyl-cyclohexadiene, styrene, p-methylstyrene, α-methylstyrene, p-chlorostyrene, p-methoxystyrene, indene, indene derivatives, or any combination thereof.

8. The TPE of claim 5, wherein said filler is selected from the group consisting of silica, carbon black, carbon nanotubes, starch, cellulose, fullerene, nanoclay, and combinations thereof.

9. The TPE of claim 8, wherein the amount of said filler is from about 1 to about 50 parts by weight based upon the total weight of all said triblock, or multiblock copolymers.

10. A biomedical composition comprising the TPE of claim 1.

11. A drug eluting coating or fiber mat comprising the composition of claim 1.

12. An inner tube or a tubeless tire comprising the composition of claim 1.

13. A thermoplastic elastomer (TPE), comprising a linear triblock or linear multiblock copolymer or any combination thereof having repeat units derived from at least one isoolefin monomer having from 4 to about 7 carbon atoms, and having repeat units derived from at least one terpene monomer having the formula $(C_5H_8)n$, wherein n is 2 or more; and optionally repeat units derived from one or more dienes, styrene or a derivative thereof, indene or a derivative thereof, or any combination thereof, wherein the isoolefin is isobutylene and the terpene is alloocimene, wherein the copolymer includes a polyisobutylene block between two alloocimene polymer blocks.

14. A biomedical composition comprising the TPE of claim 13.

\* \* \* \* \*